(12) United States Patent
Kimura et al.

(10) Patent No.: US 7,228,233 B2
(45) Date of Patent: Jun. 5, 2007

(54) DRIVING ASSISTANCE METHOD AND SYSTEM

(75) Inventors: Takeshi Kimura, Yokohama (JP); Genpei Naito, Yokohama (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 11/150,294

(22) Filed: Jun. 13, 2005

(65) Prior Publication Data

US 2005/0288844 A1      Dec. 29, 2005

(30) Foreign Application Priority Data

Jun. 24, 2004    (JP)    ............................ P2004-186531

(51) Int. Cl.
*G06F 19/00*    (2006.01)
(52) U.S. Cl. .................... 701/301; 701/41; 701/45; 701/46; 701/70; 701/96; 701/302; 340/435; 340/436; 340/903; 382/103; 382/106; 382/107
(58) Field of Classification Search .................... 701/1, 701/70, 96, 301, 302, 41, 45, 46; 340/435, 340/436, 903; 382/103, 106, 107
See application file for complete search history.

(56) References Cited

U.S. PATENT DOCUMENTS

| | | | | |
|---|---|---|---|---|
| 5,670,953 A | * | 9/1997 | Satoh et al. ................ 340/903 |
| 5,850,176 A | * | 12/1998 | Kinoshita et al. ........... 340/435 |
| 6,021,375 A | * | 2/2000 | Urai et al. .................. 701/301 |
| 6,134,497 A | * | 10/2000 | Hayashi et al. ............... 701/70 |
| 6,161,073 A | * | 12/2000 | Tange et al. .................. 701/96 |
| 6,259,992 B1 | * | 7/2001 | Urai et al. .................. 701/301 |
| 6,269,308 B1 | * | 7/2001 | Kodaka et al. .............. 701/301 |
| 6,317,693 B2 | * | 11/2001 | Kodaka et al. .............. 701/301 |
| 6,604,042 B2 | * | 8/2003 | Maruko et al. ................ 701/96 |
| 6,792,344 B2 | * | 9/2004 | Minowa et al. ............... 701/96 |
| 2003/0060936 A1 | | 3/2003 | Yamamura et al. |
| 2003/0135317 A1 | | 7/2003 | Hijikata et al. |
| 2003/0233187 A1 | | 12/2003 | Egami |
| 2004/0059482 A1 | * | 3/2004 | Hijikata ....................... 701/36 |
| 2004/0090320 A1 | * | 5/2004 | Suzuki et al. ............... 340/435 |

FOREIGN PATENT DOCUMENTS

JP    2003-205760    7/2003

* cited by examiner

*Primary Examiner*—Jack Keith
*Assistant Examiner*—Chuong Nguyen
(74) *Attorney, Agent, or Firm*—McDermott Will & Emery LLP

(57) ABSTRACT

A driving assistance system for regulating an operation of a vehicle in a discrete manner according to different ranges of risk potentials associated with the vehicle, such that different risk potentials in different ranges are conveyed to the driver in a different and discrete manner. The system includes a device for calculating a risk potential associated with the vehicle, and a data processor for regulating an operation of the vehicle, such as a reaction force applied to the acceleration pedal, based on a control parameter assuming one of a plurality of values according to the calculated risk potential associated with the vehicle, wherein each of the values is assigned to one of a plurality of predetermined ranges of risk potentials.

10 Claims, 22 Drawing Sheets

FIG.11

| | REGION 1 (LOW RP) | REGION 2 (INTERMEDIATE RP) | REGION 3 (HIGH RP) |
|---|---|---|---|
| RISK POTENTIAL (RP) | <RP_Th1 | <RP_Th2 | ≧RP_Th2 |

FIG.12

| | REPULSIVE FORCE Fc |
|---|---|
| REGION 1 | Fc1 |
| TRANSIENT FROM REGION 1 TO REGION 2 | $Fc1 + \Delta Fc12 \cdot T$ |
| TRANSIENT FROM REGION 2 TO REGION 1 | $Fc2 - \Delta Fc12 \cdot T$ |
| REGION 2 | Fc2 |
| TRANSIENT FROM REGION 2 TO REGION 3 | $Fc2 + \Delta Fc23 \cdot T$ |
| TRANSIENT FROM REGION 3 TO REGION 2 | $Fc3 - \Delta Fc23 \cdot T$ |
| REGION 3 | Fc3 |

| | REGION 1 (LOW RP) | REGION 2 (INTERMEDIATE RP) | REGION 3 (HIGH RP) |
|---|---|---|---|
| RISK POTENTIAL (RP) | INCREASING: <RP_Th1 DECREASING: <RP_Th1' | INCREASING: <RP_Th2 DECREASING: <RP_Th2' | INCREASING: ≥RP_Th2 DECREASING: ≥RP_Th2' |

| | REGION 1 (LOW RP) | REGION 2 (INTERMEDIATE RP) | REGION 3 (HIGH RP) |
|---|---|---|---|
| $\Delta RP < \Delta RP1$ | $< RP\_Th1$ | $< RP\_Th2$ | $\geq RP\_Th2$ |
| $\Delta RP \geq \Delta RP1$ | $< RP\_Th1'$ | $< RP\_Th2'$ | $\geq RP\_Th2'$ |

|  | REGION 1 (LOW RP) | REGION 2 (INTERMEDIATE RP) | REGION 3 (HIGH RP) |
|---|---|---|---|
| THW | >THW_Th1 | >THW_Th2 | ≦THW_Th2 |
| TTC | >TTC_Th1 | >TTC_Th2 | ≦TTC_Th2 |

|  | GAIN k1 | GAIN k2 |
|---|---|---|
| REGION 1 | k1_1 | k2_1 |
| TRANSIENT FROM REGION 1 TO REGION 2 | k1_1+Δk1_12·T | k2_1+Δk2_12·T |
| TRANSIENT FROM REGION 2 TO REGION 1 | k1_2−Δk1_12·T | k2_2−Δk2_12·T |
| REGION 2 | k1_2 | k2_2 |
| TRANSIENT FROM REGION 2 TO REGION 3 | k1_2+Δk1_23·T | k2_2+Δk2_23·T |
| TRANSIENT FROM REGION 3 TO REGION 2 | k1_3−Δk1_23·T | k2_3−Δk2_23·T |
| REGION 3 | k1_3 | k2_3 |

FIG.29

|  | GAIN k1 | GAIN k2 | LIMIT RATE OF CHANGE ΔF |
|---|---|---|---|
| REGION 1 | k1_1 | k2_1 | ΔF_1 |
| REGION 2 | k1_2 | k2_2 | ΔF_2 |
| REGION 3 | k1_3 | k2_3 | ΔF_3 |

FIG.31

| | GAIN k3 |
|---|---|
| REGION 1 | k3_1 |
| TRANSIENT FROM REGION 1 TO REGION 2 | k3_1 + Δk3_12·T |
| TRANSIENT FROM REGION 2 TO REGION 1 | k3_2 − Δk3_12·T |
| REGION 2 | k3_2 |
| TRANSIENT FROM REGION 2 TO REGION 3 | k3_2 + Δk3_23·T |
| TRANSIENT FROM REGION 3 TO REGION 2 | k3_3 − Δk3_23·T |
| REGION 3 | k3_3 |

FIG.32

| | THE LEAST UPPER BOUND F1 OF REPULSIVE FORCE |
|---|---|
| REGION 1 | F1_1 |
| TRANSIENT FROM REGION 1 TO REGION 2 | F1_1 + ΔF1_12·T |
| TRANSIENT FROM REGION 2 TO REGION 1 | F1_2 − ΔF1_12·T |
| REGION 2 | F1_2 |
| TRANSIENT FROM REGION 2 TO REGION 3 | F1_2 + ΔF1_23·T |
| TRANSIENT FROM REGION 3 TO REGION 2 | F1_3 − ΔF1_23·T |
| REGION 3 | F1_3 |

|  | THE LEAST UPPER BOUND F1 OF REPULSIVE FORCE | LIMIT RATE OF CHANGE ΔF |
|---|---|---|
| REGION 1 | F1_1 | ΔF_1 |
| REGION 2 | F1_2 | ΔF_2 |
| REGION 3 | F1_3 | ΔF_3 |

DRIVING ASSISTANCE METHOD AND SYSTEM

RELATED APPLICATION

The present application claims the benefit of priority from Japanese Patent Application No. 2004-186531, filed Jun. 24, 2004, the disclosure of which is incorporated herein by reference in its entirety.

FIELD OF THE DISCLOSURE

The present disclosure relates to a method and system for assisting a driver in operating a vehicle, and more specifically, to a driving assistance method and system that regulates at least one of a driving force, a braking force and a reaction force applied to a driver-controlled input device based on different ranges of risk potentials associated with a vehicle.

BACKGROUND OF THE DISCLOSURE

Various types of driving assistance systems were proposed in the past. For instance, a system described in a US published patent application No. US2003/0060936 A1 includes a controller, at least one actuator and a data acquisition system for obtaining data related to a status of a vehicle and an environment in a field around the vehicle. The controller determines a future environment in the field around the vehicle using the acquired data, and generates an operator response plan in response to the determined future environment. The plan prompts the operator to operate the vehicle in a desired manner. The actuator is coupled to a driver controlled input device to mechanically affect operation of the input device in a manner that prompts, via a haptic input to the driver to operate the vehicle in the desired manner.

Another example of such systems is proposed in US published patent application No. US2003/0233187 A1. This system transmits a risk associated with a host vehicle (or alternatively called an own vehicle) to a driver by a reaction force input applied to an accelerator pedal. Based on the position of the accelerator pedal, an inter-vehicle distance between the host vehicle and another vehicle in a field around the vehicle.

Still another example of such systems is proposed in US published patent application US2003/0135317 A1 (Japanese counterpart JP2003-205760 A). This system transmits a risk associated with a vehicle to a driver by a reaction force input via an accelerator pedal. The reaction force input is exponentially proportional to the risk so that the driver is kept informed of the progress of the risk.

These conventional systems, however, do not transmit different levels of risk to the driver in a sufficiently clear and discrete manner because the reaction force input via the accelerator pedal varies continuously with the risk.

Accordingly, there is a need for a method and system that can transmit different levels of risk around a vehicle to a driver in a clear and distinct manner.

SUMMARY OF THE DISCLOSURE

An exemplary driving assistance system according to this disclosure includes a device for calculating a risk potential associated with the vehicle, and a data processor for regulating an operation of the vehicle based on a control parameter. The control parameter assumes one of a plurality of values according to the calculated risk potential associated with the vehicle, wherein each of the values is assigned to one of a plurality of predetermined ranges of risk potentials.

In one aspect, the data processor is configured to perform the steps of responsive to the calculated risk potential changing from a first risk potential in a first predetermined range of risk potentials to a second risk potential in a second predetermined range of risk potentials, changing the control parameter from a first value assigned to the first predetermined range of risk potentials to a second value assigned to the second predetermined range of risk potentials, wherein the control parameter changes from the first value to the second value at a predetermined rate. The second value may be constant. In another aspect, responsive the second predetermined range of risk potentials being a higher range of risk potentials, the second value has a higher value, and the control parameter changes from the first value to the second value at a higher rate.

According to one embodiment, at least one of the plurality of predetermined ranges includes a first region having an assigned value varies with the risk potential, and a second region having a constant assigned value. In one aspect, the second region of each of the plurality of predetermined ranges may have the same length. In another aspect, the first region of each of the at least one of the plurality of predetermined ranges may have the same length. The second region of each of the at least one of the plurality of predetermined ranges may have the same length. In still another aspect, the second region of a predetermined range covering a higher range may have a shorter length than the second region of a predetermined range covering a lower range.

According to another embodiment, the plurality of predetermined ranges of risk potentials includes at least two different lengths. According to still another embodiment, the plurality of predetermined ranges includes a first set of predetermined ranges for applying to an increasing risk potential, and a second set of predetermined ranges for applying to a decreasing risk potential. The assigned value of the control parameter corresponding to a risk potential in at least one of the first set of predetermined ranges is different to the assigned value to of the control parameter corresponding to the same risk potential in at least one of the second set of predetermined ranges, whereby hysteresis is provided to the change of the value of the control parameter. In one aspect, the hysteresis provided at a higher range of risk potentials is more significant than the hysteresis provided at a lower range of risk potentials.

According to yet another embodiment, each of the assigned values of the control parameter changes in proportion to a gain factor, and the gain factor assumes one of a plurality of gain values assigned to one of a plurality of predetermined ranges of risk potentials. In one aspect, the data processor is configured to perform the step of responsive to the calculated risk potential changing from a first risk potential in a first predetermined range of risk potentials to a second risk potential in a second predetermined range of risk potentials, controlling the gain factor to change from a first gain value assigned to the first predetermined range of risk potentials to a second gain value assigned to the second predetermined range of risk potentials, wherein the gain factor changes from the first gain value to the second gain value at a predetermined rate. In another aspect, an upper limit is set for each of the assigned values of the control parameter; and the upper limit assumes one of a plurality of upper limit values assigned to one of a plurality of predetermined ranges of risk potentials. The data processor may further perform the step of responsive to the calculated risk potential changing from a first risk potential in a first predetermined range of risk potentials to a second risk potential in a second predetermined range of risk potentials, controlling the upper limit to change from a first upper limit value assigned to the first predetermined range of risk potentials to a second upper limit value assigned to the second predetermined range of risk potentials, wherein the upper limit changes from the first upper limit value to the upper limit value at a predetermined rate.

According to still another embodiment, the data processor is configured to alter the operation of the vehicle by changing at least one of a driving force of the vehicle, a breaking force applied to the vehicle, and a reaction force applied to a control device of the vehicle, such as a steering wheel or an acceleration pedal.

Additional advantages and novel features of the present disclosure will be set forth in part in the description which follows, and in part will become apparent to those skilled in the art upon examination of the following, or may be learned by practice of the present disclosure. The embodiments shown and described provide an illustration of the best mode contemplated for carrying out the present disclosure. The disclosure is capable of modifications in various obvious respects, all without departing from the spirit and scope thereof. Accordingly, the drawings and description are to be regarded as illustrative in nature, and not as restrictive. The advantages of the present disclosure may be realized and attained by means of the instrumentalities and combinations particularly pointed out in the appended claims.

BRIEF DESCRIPTION OF THE DRAWINGS

The present disclosure is illustrated by way of example, and not by way of limitation, in the accompanying drawings, wherein elements having the same reference numeral designations represent like elements throughout.

FIG. 11 is a table illustrating regions into which a risk potential RP should be classified.

FIG. 12 is a table illustrating various values of a control parameter in the form of a repulsive force Fc in different regions and having different transient periods, each beginning immediately after the risk potential RP has been classified into a new one of the regions.

FIG. 29 is a table illustrating various values of control parameters in the form of gains k1 and k2 and variance (limit rate of ΔF with different regions and with different transient periods according to the modification to the fourth exemplary embodiment.

FIG. 31 is a table illustrating various values of a control parameter in the form of a gain k3 with the different regions and with different transient periods, according to the fifth exemplary embodiment.

FIG. 32 is a table illustrating various values of a control parameter in the form of the least upper bound F1 of a repulsive force Fc with the different regions and with different transient periods according to the sixth exemplary embodiment.

DETAILED DESCRIPTION OF THE DISCLOSURE

In the following description, for the purposes of explanation, numerous specific details are set forth in order to provide a thorough understanding of the present disclosure. It will be apparent, however, to one skilled in the art that concepts of the disclosure may be practiced or implemented without these specific details. In other instances, well-known structures and devices are shown in block diagram form in order to avoid unnecessarily obscuring the present disclosure.

FIRST EXEMPLARY EMBODIMENT

Figure 1:
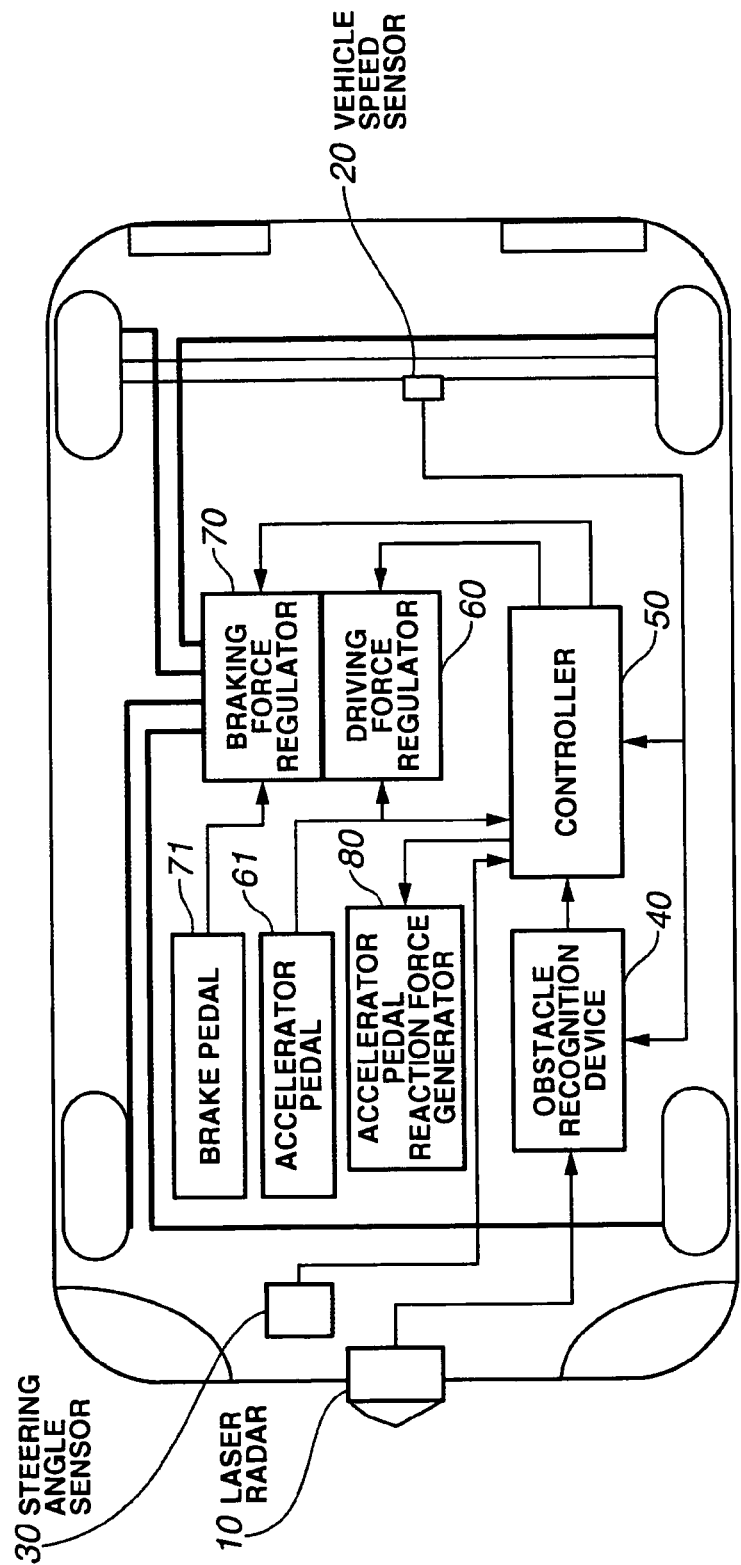
FIG. 1 is a block diagram of a motor vehicle equipped with a first exemplary embodiment of a system according to the present disclosure.

FIG. 1 depicts a motor vehicle 1 including an exemplary driving assistance system of this disclosure. The system comprises a radar device 10, a vehicle speed sensor 20, a steering angle sensor 30, an obstacle recognition device 40, a controller 50, a driving force regulator 60, a braking force regulator 70 and an accelerator pedal reaction force generator 80.

Radar 10 is disposed at the center of a front grill or a front bumper of vehicle 1 for transmitting pulsed beam or radar waves in order to detect obstacles within the field of view of the radar. Radar 10 may be of different types, such as a millimeter wave, frequently modulated continuous (FMCW) radar, or an infrared laser radar type (as used in FIG. 1). An infrared pulsed beam travels toward a measurement zone. A light receiving device receives the transmitted beam returning from an obstacle within the measurement zone. With the use of a rotating polygonal mirror, two-dimensional scanning in the forward direction is possible, so that the pulsed beam can be swiveled horizontally due to the rotation of the polygonal mirror, and the pulsed beam can be swiveled vertically due to a plurality of mirror surfaces of the polygonal mirror inclined at different angles. In one embodiment, a beam of pulses can be swiveled horizontally and laterally about 6 degrees to each side of a longitudinal line passing through the center of vehicle 1.

Based on the time delay and phase difference between the transmitted beam from the laser radar 10 and the received reflected beam, control logic determines a distance and azimuth angle between each of the detected obstacle(s) and vehicle 1.

Figure 2:
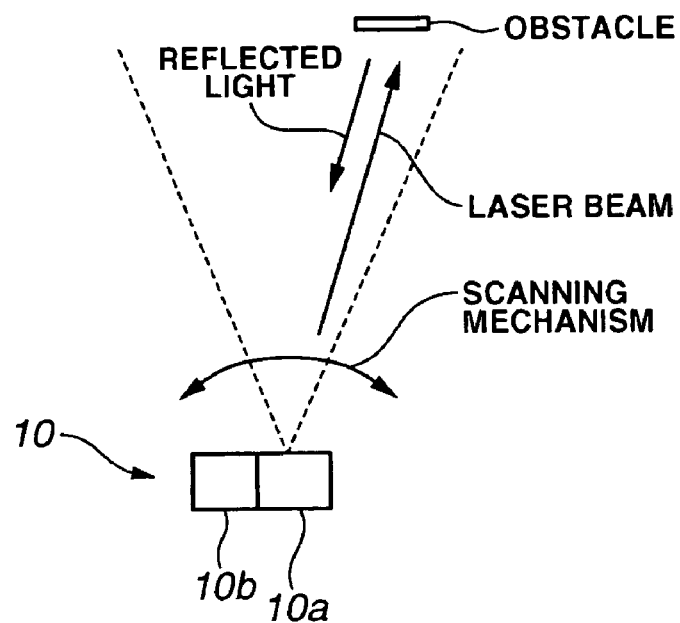
FIG. 2 is a state diagram illustrating the detection of an obstacle by radar.

As shown in FIG. 2, radar 10 emits an infrared laser beam in a horizontal direction, scanning an area in front of vehicle 1 to detect the existence of obstacles. Radar 10 includes a light-emitting section 10a, which emits a laser beam, and a light-receiving section 10b, which detects reflected light. The light-emitting section 10a is combined with a scanning mechanism and is configured to swing as shown by an arrow in FIG. 2. The light emitting section 10a sequentially emits light within a predetermined angle range. Radar 10 measures a distance from vehicle 1 to the obstacle based upon a time difference between the laser beam emission by the light-emitting section 10a and receipt of a reflected beam by the light-receiving section 10b.

While scanning the area in front of vehicle 1, radar 10 measures a distance to an obstacle for each scanning position or scanning angle when the reflected light is received. Radar 10 also measures the lateral position of the obstacle relative to vehicle 1 based upon the scanning angle upon receiving reflected light by the obstacle, and the distance to the obstacle. In other words, radar 10 detects the presence of obstacle(s) and position of each obstacle relative to vehicle 1.

Figure 3:
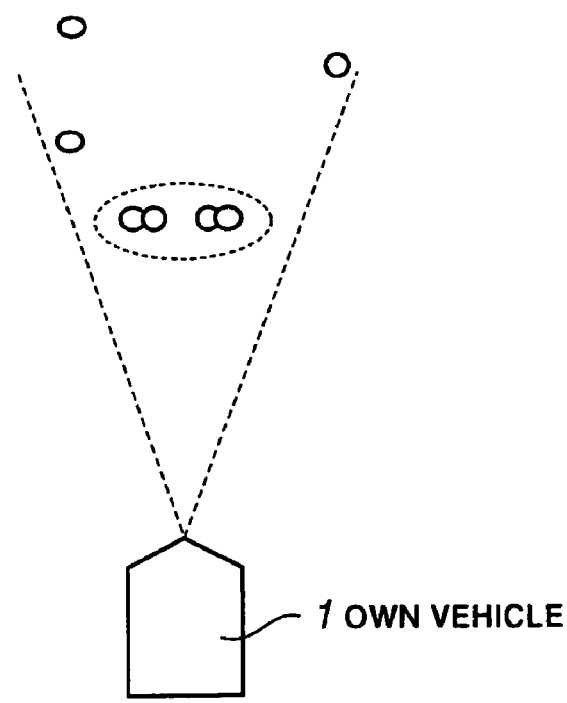
FIG. 3 is a state diagram of a scanning area in front of the vehicle.

FIG. 3 is a state diagram illustrating detection of an obstacle by radar 10. The position of the obstacle relative to vehicle 1 is specified at each scanning angle, thus obtaining a plan view of the presence of obstacles within a scanning range by radar 10. Obstacle recognition device 40 receives information of the obstacle(s) from radar 10 and vehicle speed sensor 20, in order to identify movements of the detected obstacles based on detection results provided by radar 10 in each scanning cycle or at each scanning angle. At the same time, obstacle recognition device 40 determines whether a detected object is the same obstacle or different obstacles based upon the closeness between the obstacles, similarities in movements of the obstacles, and the like.

Based on signals from radar 10 and vehicle speed sensor 20, obstacle recognition device 40 recognizes a relative distance and speed between vehicle 1 and the obstacle, a lateral distance from vehicle 1 to the obstacle, and the width of the obstacle. If obstacles are in front of vehicle 1, the obstacle recognition device 40 obtains information on each of the obstacles. Obstacle recognition device 40 provides the information related to the obstacle(s) to controller 50.

Steering angle sensor 30 is provided to detect an angular movement of a steering shaft and outputs the steering angle to controller 50. An accelerator pedal stroke sensor is provided to detect a position of an accelerator pedal 61. A sensor signal of the accelerator pedal stroke sensor indicates the detected position, which represents a driver's demand for engine output, denoted as driver power demand SA. The sensor signal indicative of the driver power demand SA is fed to controller 50 and driving force regulator 60.

A brake pedal stroke sensor is provided to detect a position of a brake pedal 71. A sensor signal of the brake pedal stroke sensor indicates the detected position of brake pedal 71, which represents a driver's request for braking force, denoted as driver brake demand SB. The sensor signal indicative of the driver brake demand SB is fed to braking force regulator 70 for calculation of a brake control signal for controlling a hydraulic brake system. The hydraulic brake system includes wheel brakes.

Controller 50 includes a microprocessor, such as a central processing unit (CPU), and a computer readable storage medium, such as a read only memory (ROM), a random access memory (RAM). Controller 50 recognizes the operation state of host vehicle 1 (or alternatively called an own vehicle) based on the host vehicle speed from the vehicle speed sensor 20 and the information on the detected obstacles from the obstacle recognition device 40. Controller 50 calculates a risk potential based on the operation state of the host vehicle. Controller 50 further controls regulation of a braking torque, a driving torque and a reaction force applied to accelerator pedal 61. As shown in FIG. 1, controller 50 provides a driving force correction amount ΔDa to driving force regulator 60 and a braking force correction amount ΔDb to braking force regulator 70.

Figure 4:
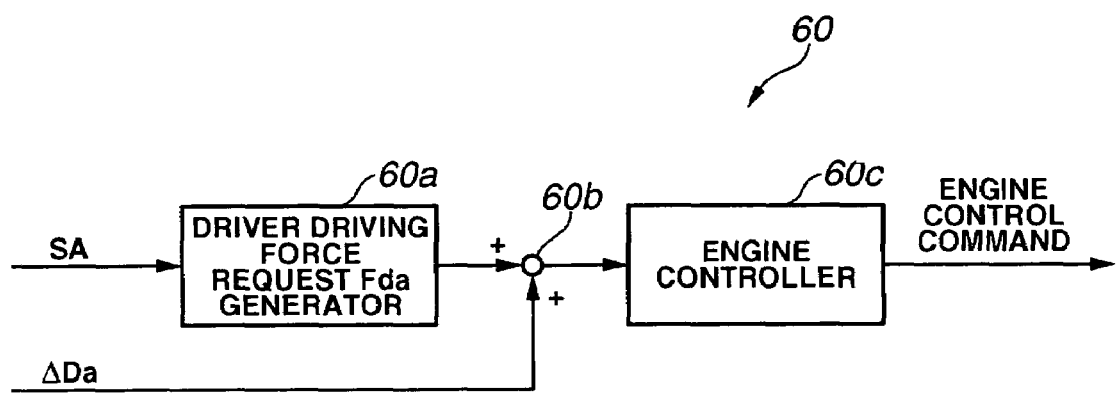
FIG. 4 is a block diagram of a driving force regulator with a correction input.
Figure 5:
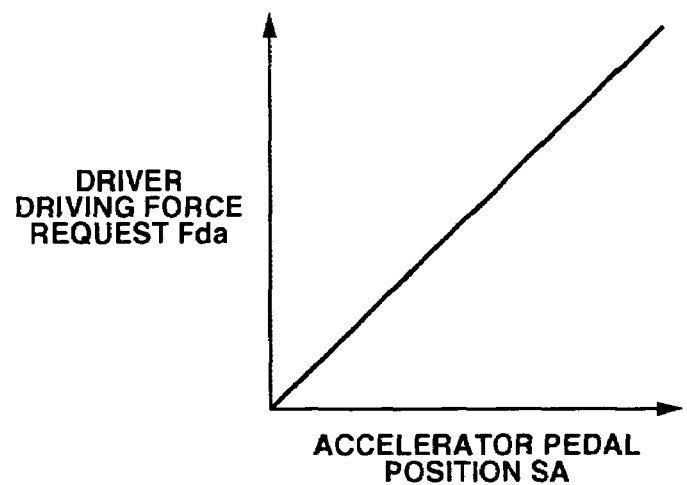
FIG. 5 shows a driver driving force request (Fda) versus a driver power demand (SA, an accelerator pedal position) characteristic provided by a driving force request generation device of the driving force controller.

FIG. 4 illustrates a block diagram of an exemplary driving force regulator 60 with a correction device 60b, as indicated by the summation operation in FIG. 4. Driving force regulator 60 includes a driving force request generator 60a and an engine controller 60c. The driving force request generator 60a receives the accelerator pedal position or driver power demand SA, and provides a driver driving force request Fda, the characteristics of which is varied with different values of accelerator pedal position or driver power demand SA as illustrated in FIG. 5. The driver driving force request Fda is fed to correction device 60b. At the correction device 60b, the driver driving force request Fda is modified by the driving force correction amount ΔDa to provide a target driving force tFda. In response to the target driving force tFda, engine controller 60c calculates an engine control command.

Figure 6:
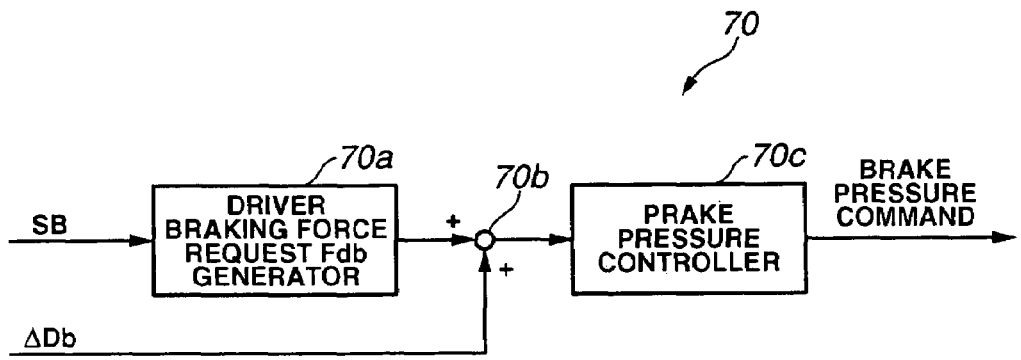
FIG. 6 is a block diagram of a braking force regulator with a correction input.
Figure 7:
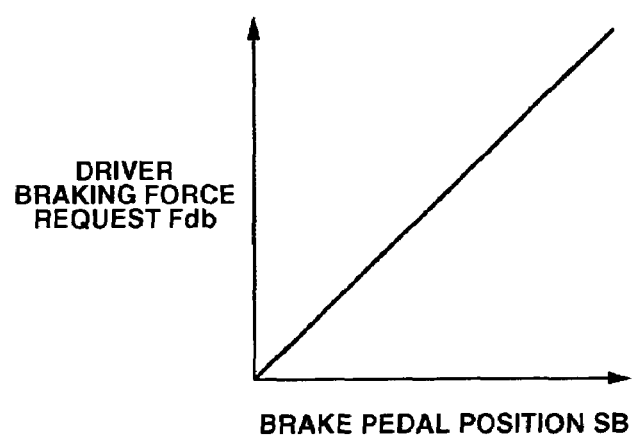
FIG. 7 shows a driver braking force request (Fdb) versus a driver brake demand (SB, a brake pedal position) characteristic provided by a braking force request generation device of the braking force controller.

FIG. 6 illustrates a block diagram of braking force regulator 70 with a correction device 70b, as indicated by the summation operation in FIG. 6. Braking force regulator 70 includes a driver braking force request generator 70a and a brake pressure controller 70c. Driver braking force request generator 70a receives the brake pedal position or driver brake demand SB and provides a driver braking force request Fdb, the characteristic of which is varied with different values of the brake pedal position or driver brake demand SB as illustrated in FIG. 7. The driver braking force request Fdb is fed to correction device 70b. At correction device 70b, the driver braking force request Fdb is modified by the braking force correction amount ΔDb to provide a target braking force tFdb. In response to the target braking force tFdb, the brake pressure controller 70c calculates a brake pressure command. In response to the brake pressure command, fluid pressure within each of wheel cylinders applies a braking torque to vehicle 1.

The accelerator pedal reaction force generator 80 is provided with a servo motor incorporated in a link mechanism of the accelerator pedal 61. In response to a reaction force command from controller 50, the accelerator pedal reaction force generator 80 regulates reaction force applied to accelerator pedal 61 by regulating torque output of the servo motor. When the accelerator pedal reaction force generator 80 ceases to regulate the reaction force, the reaction force proportional to the accelerator pedal position or driver power demand SA is applied to the driver via the accelerator pedal 61.

The operation of the first exemplary embodiment is now described. The exemplary system calculates a risk potential RP, indicative of risk of collision between host vehicle 1 and the preceding vehicle, based on the information provided by the obstacle recognition device 40. The system classifies the risk potential RP into one of a predetermined plurality of regions, calculates a control parameter in the form of a repulsive force Fc corresponding to the region into which the risk potential RP is classified, and regulates a braking force, a driving force, and a reaction force applied to the accelerator pedal 61 in accordance with the calculated repulsive force Fc.

The concept of repulsive force Fc is an imaginary running resistance of host vehicle 1. The setting of the repulsive force Fc is that the higher region into which the risk potential RP is classified, the larger the repulsive force Fc is. A shift into a new region may be responsive to a change in the risk potential RP. In order to transmit the shift in region to the driver easily and clearly, the system appropriately sets the rate of change in repulsive force Fc.

Figure 8:
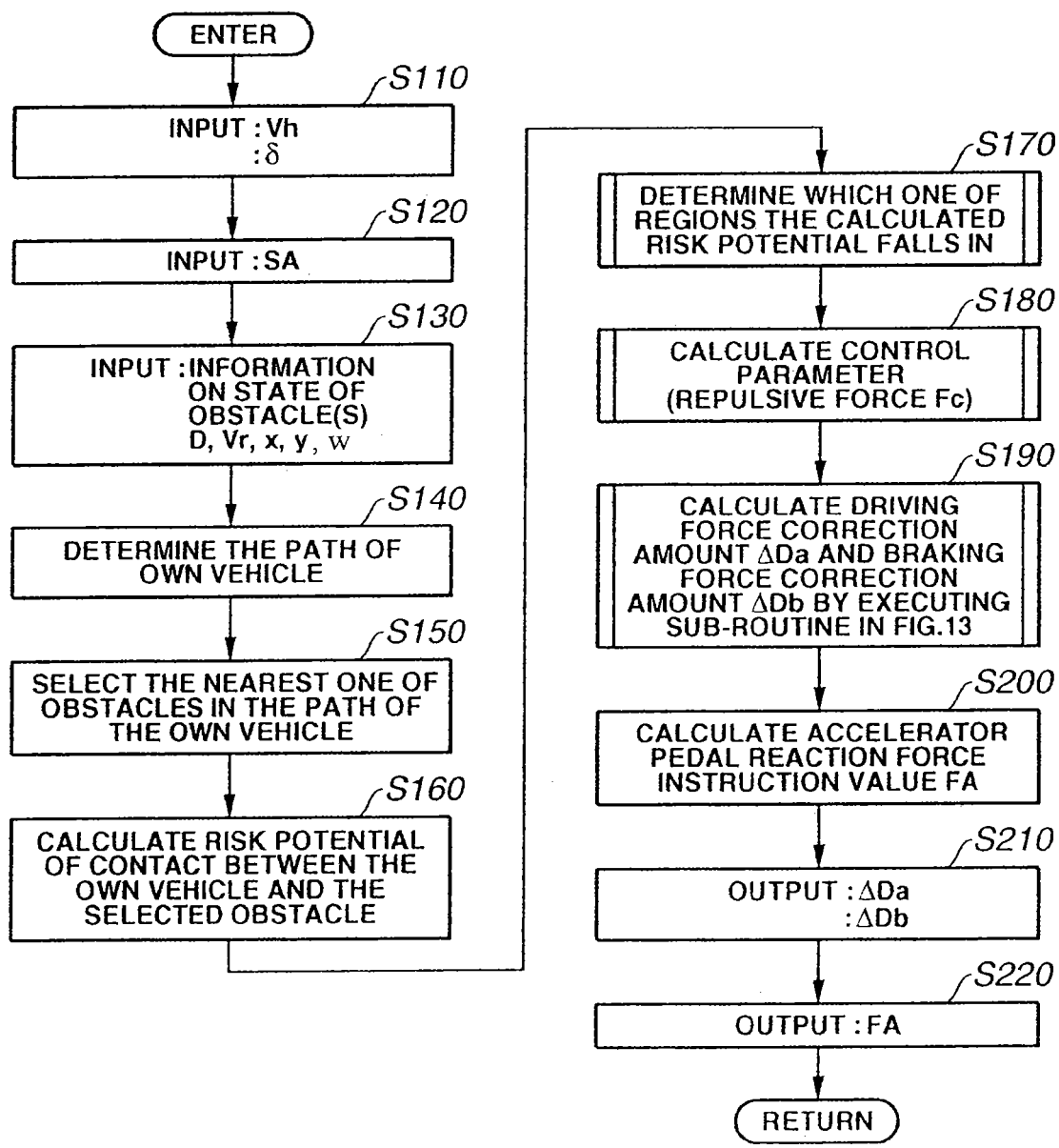
FIG. 8 is a flow chart of a main control routine illustrating the operation of the first exemplary embodiment shown in FIG. 1.

FIG. 8 is a flow chart of a main control routine illustrating the operation of the first exemplary embodiment of the system according to the present disclosure. In the first exemplary embodiment, controller 50 repeats execution of the main control routine at regular intervals of, for example, 50 milliseconds.

In FIG. 8, at step S110, controller 50 performs reading operation of outputs of the vehicle speed sensor 20 and steering angle sensor 30 to receive a host vehicle speed Vh and a steering angle δ.

At step S120, controller 50 performs reading operation of output of the accelerator pedal stroke sensor for the accelerator pedal 61 to receive the accelerator pedal position or driver power demand SA expressed through the accelerator pedal 61.

At step S130, controller 50 performs receive an inter-vehicle distance D between host vehicle 1 and each of the obstacles, a relative speed Vr between host vehicle 1 and each of the obstacles, and a lateral position, x, a longitudinal position, y, and a width W of each of the obstacles. The obstacle recognition device 40 calculates the above-mentioned data (D, Vr, x, y, W) based on outputs of radar 10 and vehicle speed sensor 20.

At step 140, controller 50 determines a traveling path of vehicle 1 based on the vehicle speed Vh and steering angle δ, which were received at the step S110. Controller 50 determines a curvature ρ (1/m) of the traveling path of vehicle 1 based on the vehicle speed Vh and steering angle δ. The curvature ρ may be expressed as:

$$\rho = 1/\{L(1 + A \cdot Vh^2)\} \times \delta/N \tag{Eq. 1}$$

where: L is the wheel base of vehicle 1; A (a positive constant) is the stability factor of vehicle 1; and N is a steering gear ratio of vehicle 1.

The radius of curvature R may be expressed as:

$$R = 1/\rho \tag{Eq. 2}$$

Figure 9:
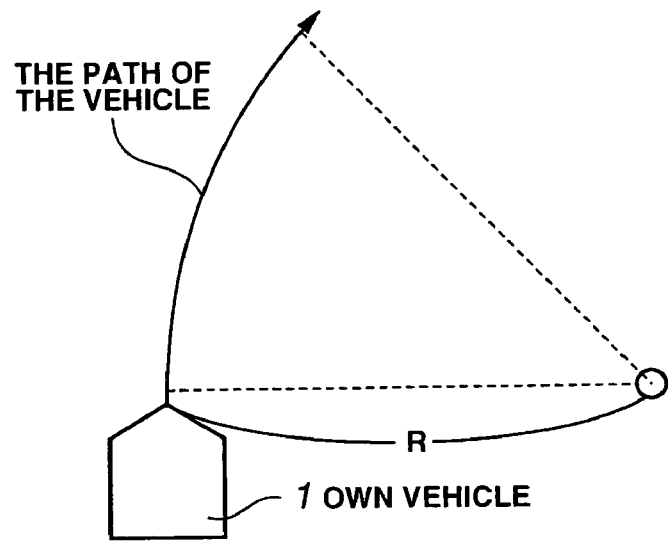
FIG. 9 is a state diagram of determining the centerline of the path of the vehicle.
Figure 10:
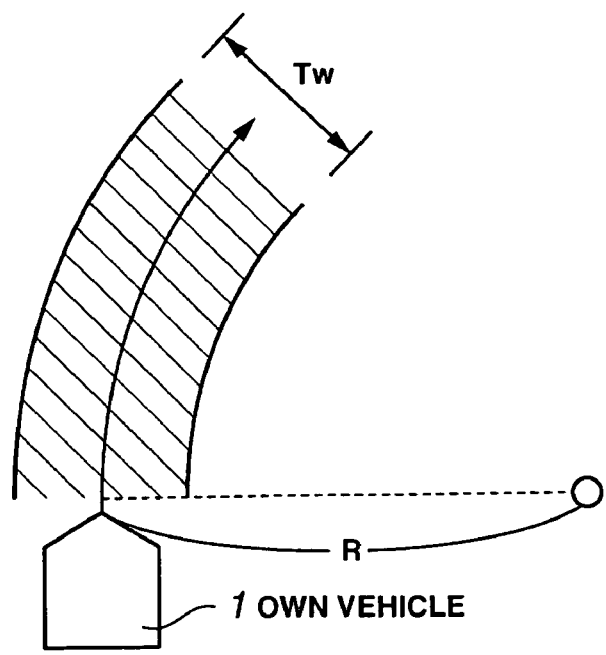
FIG. 10 is a state diagram of the path of the vehicle.

Controller 50 determines the radius of curvature R as shown in FIG. 9 and sets the curvature R as the centerline of a traveling path of vehicle 1 as shown in FIG. 10. The traveling path recognized by controller 50 is illustrated by the shadowed area in FIG. 10. The traveling path has a width Tw, accounting for a width of vehicle 1. The width Tw may be a predetermined value or may vary with a change in the vehicle speed Vh.

At step S150, controller 50 selects the closest obstacle in the path of host vehicle 1, and sets the selected obstacle as a target obstacle, namely, an in-path target obstacle or a preceding vehicle.

At step S160, controller 50 calculates a risk potential RP of host vehicle 1 with respect to the target obstacle or the target preceding vehicle, indicative of a collision risk between host vehicle 1 and the target preceding vehicle.

Firstly, controller 50 calculates a time to contact TTC with respect to each of the recognized obstacles. TTC is indicative of a degree of approach to the preceding vehicle by the host vehicle, and is a measure of time from a present point in time to the point in time when the distance D becomes zero, given that the relative speed Vr remains unchanged. The TTC may be expressed as:

$$TTC = -D/Vr \quad \text{(Eq. 3)}$$

The smaller the value of TTC, the more imminent that the host vehicle would collide with the preceding vehicle. In a scenario where the host vehicle is following the preceding vehicle, most vehicle drivers perceives a high degree of collision risk and initiates deceleration to avoid collision well before the TTC becomes less than 4 seconds. To some extent, the TTC is a good indication for predicting a future behavior of the vehicle driver. However, TTC alone is insufficient to describe the degree of risk perceived by a driver.

For instance, consider a scenario where the relative speed Vr is zero. In this case, the TTC is infinite irrespective of how short the distance D is. However, the driver perceives an increase in the degree of risk when the distance D is small. An unpredictable drop in the vehicle speed V2 of the preceding vehicle may cause a possible collision between the host vehicle and the preceding vehicle.

To remedy the above-mentioned discrepancy, the notion of time headway THW has been introduced to quantify an increase in influence on the TTC by an unpredictable drop in the vehicle speed of the preceding vehicle. The THW is a measure of a timer that is set to count up when the preceding vehicle reaches a point of the road, and is be reset subsequently when the following vehicle reaches the same point. The THW is expressed as, $$THW = D/Vh \quad \text{(Eq. 4)}$$

In the case where the host vehicle is following the preceding vehicle, the vehicle speed of the preceding vehicle may be used instead of the vehicle speed Vh of host vehicle 1 in equation Eq. 4.

The relationship between the TTC and THW is that a change in the speed of the preceding vehicle results in a small change in the TTC when the THW is long, but the same amount of change results in a large change in the TTC when the THW is small.

In this first exemplary embodiment, the risk potential RP is calculated using the reciprocal of the TTC and the reciprocal of the THW. The risk potential RP may be expressed as:

$$RP = a/THW + b/TTC \quad \text{(Eq. 5)}$$

where: b and a (b>a) are parameters weighting 1/TTC and 1/THW, respectively, such that 1/THW is less weighted than 1/TTC. The values of b and a are optimized after accounting for a statistics of THW and TTC collected in a traffic scene including the host vehicle and the preceding vehicle. In this exemplary embodiment, b=8 and a=1.

At step S170, controller 50 classifies the risk potential RP calculated at step S160 into one of a plurality of predetermined ranges. In other words, the controller determines which range the calculated risk potential RP falls in. As shown in FIG. 11, three predetermined ranges are set as range 1, range 2 and range 3. Controller 50 determines that the risk potential RP is classified into range 1 if the risk potential RP is less than a first threshold value RP_Th1 (0≦RP<RP_Th1). Controller 50 determines that the risk potential RP is classified into range 2 if the risk potential RP is greater than the first threshold value RP_Th1 but less than a second threshold value (RP_Th1≦RP<RP_Th2). Controller 50 determines that the risk potential RP is classified into range 3 if the risk potential RP is greater than or equal to the second threshold value RP_Th2 (RP_Th2≦RP).

At step S180, controller 50 calculates a value of the repulsive force Fc for the range into which the risk potential RP has been classified. FIG. 12 is a table tabulating the relationship between values of the repulsive force Fc and ranges 1, 2 and 3. The repulsive force Fc assumes a value of Fc1 when the risk potential RP is in range 1. The repulsive force Fc assumes a value Fc2 when the risk potential RP is in range 2. The repulsive force Fc assumes a value of Fc3 when the risk potential RP stays in range 3. The relationship is that Fc1<Fc2<Fc3.

During a transient period from a present one of ranges 1, 2 and 3 to the adjacent new range, the repulsive force Fc changes at a rate ΔFc from the value for the present range to the value for the new range. The repulsive force Fc can be expressed by the following equation:

From the present range 1 to the new range 2:
$$Fc = Fc1 + \Delta Fc12 \cdot T$$

From the present range 2 to the new range 1:
$$Fc = Fc2 - \Delta Fc12 \cdot T$$

From the present range 2 to the new range 3:
$$Fc = Fc2 + \Delta Fc23 \cdot T$$

From the present range 3 to the new range 2:
$$Fc = Fc3 - \Delta Fc23 \cdot T \quad \text{(Eq. 6)}$$

The rate ΔFc12 indicates a change of the repulsive force Fc with respect to time during a transient period between range 1 and range 2. Rate ΔFc23 indicates a change of the repulsive force Fc with respect to time during a transient period between range 2 and range 3. The relationship between ΔFc12 and ΔFc23 is that ΔFc12<ΔFc23. In the equation Eq. 6, T is time between starting changing from a range into which the risk potential RP is classified.

Figure 13:
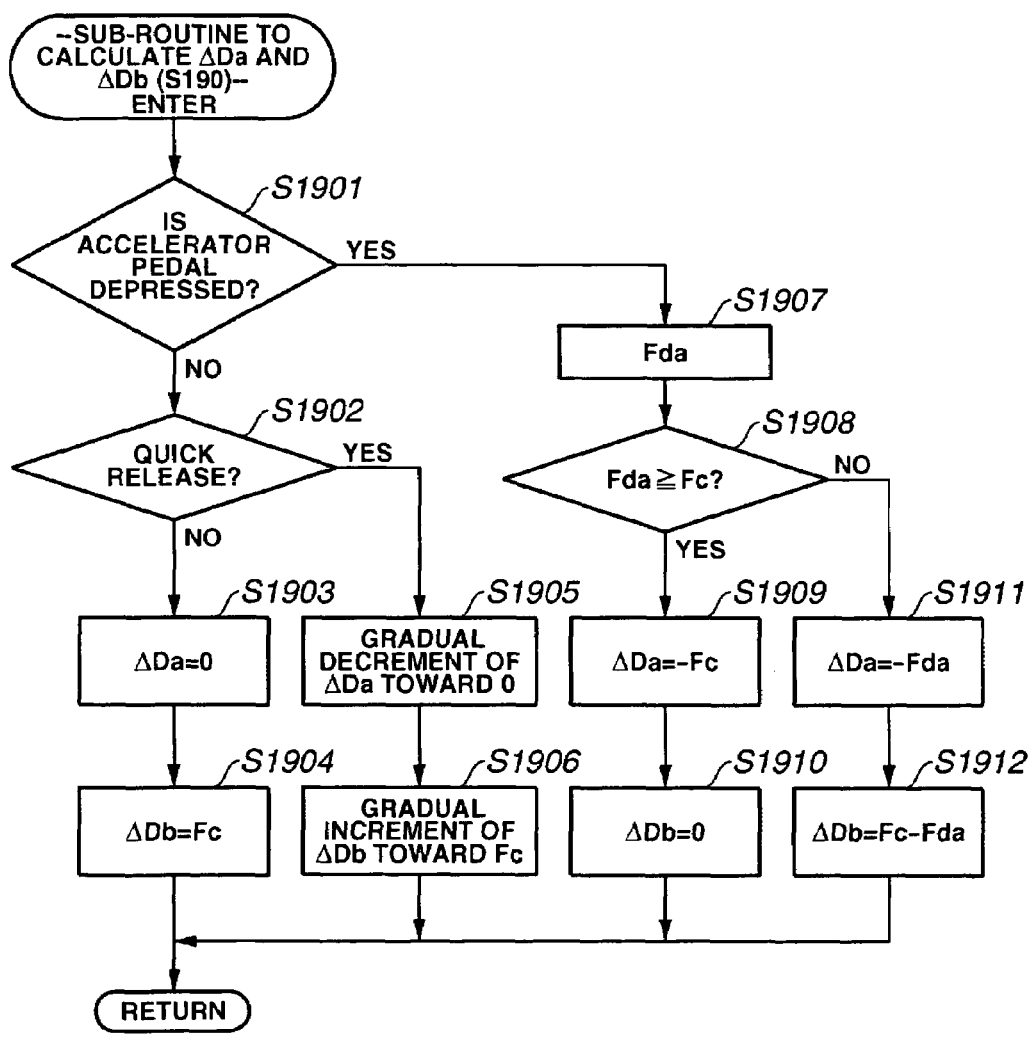
FIG. 13 is a flow chart of a sub-routine to calculate a driving force correction amount and a braking force correction amount.

At step S190, controller 50 calculates a driving force correction amount ΔDa and a braking force correction amount ΔDb based on the repulsive force Fc calculated at step S180 by executing a sub-routine in FIG. 13.

In FIG. 13, at step S1901, controller 50 determines whether the accelerator pedal 61 is depressed based on the accelerator pedal position SA obtained at step S120. If the accelerator pedal 61 is not depressed, the routine proceeds to step S1902. At step S1902, controller 50 determines whether the accelerator pedal 61 has been released quickly. This determination is made by comparing an operation speed of the accelerator pedal 61 to a predetermined value. The operation speed may be calculated from a rate of change in accelerator pedal position SA. If, at step S1902, controller 50 determines that the accelerator pedal 61 has been released slowly, the routine proceeds to step S1903. At step S1903, controller 50 sets the driving force correction amount ΔDa to 0 (ΔDa=0). At the next step S1904, controller 50 sets the braking force correction amount ΔDb to the repulsive force Fc.

If, at step S1902, controller 50 determines that the accelerator pedal 61 has been quickly released, the routine proceeds to step S1905. At step S1905, controller 50 carries out a decrement of the driving force correction amount ΔDa for gradually decreasing the driving force correction amount ΔDa toward 0. At the next step S1906, controller 50 carries out an increment of the braking force correction amount ΔDb for gradually increasing the braking force correction amount ΔDb toward the repulsive force Fc.

If, at step S1901, controller 50 determines that the accelerator pedal 61 is depressed, the routine proceeds to step S1907. At step S1907, controller 50 determines a driver driving force request Fda relative to accelerator pedal position SA by using the relationship illustrated in FIG. 5, and generates the determined driver driving force request Fda.

At the next step S1908, controller 50 determines whether the driver driving force request Fda is no less than the repulsive force Fc. If this is the case, the routine proceeds to step S1909. At step S1909, controller 50 sets the driving force correction amount ΔDa to −Fc (ΔDa=−Fc). At the next step S1910, controller 50 sets the braking force correction amount ΔDb to 0 (ΔDb=0). As (Fda−Fc) is greater than or equal to 0 (Fda−Fc≧0), a positive driving force remains even after subtracting the repulsive force Fc from the driver driving force request Fda. Accordingly, the driving force regulator 60 suffices for the output of correction amount. Under this condition, the driver feels that the degree of acceleration is provided less than expected. If the corrected driving force is greater than the running resistance, the driver feels a drop in the degree of acceleration. If the corrected driving force is not greater than the running resistance, the driver feels a degree of deceleration.

If, at step S1908, controller 50 determines that the driver driving force request Fda is less than the repulsive force Fc, the routine proceeds to step S1911. At step S1911, controller 50 sets the driving force correction amount ΔDa to −Fda (ΔDa=−Fda). At the next step S1912, controller 50 sets the braking force correction amount ΔDb to a compensation (Fc−Fda) for a shortage in the driving force correction amount. In this case, the driver feels entertain degree of deceleration.

Turning back to FIG. 8, after calculating the driving force correction amount ΔDa and the braking force correction amount ΔDb at step S190, the routine proceeds to step S200. At step S200, controller 50 calculates an accelerator pedal reaction force instruction value FA indicative of an amount by which the reaction force applied to the accelerator pedal 61 should be increased.

Figure 14:
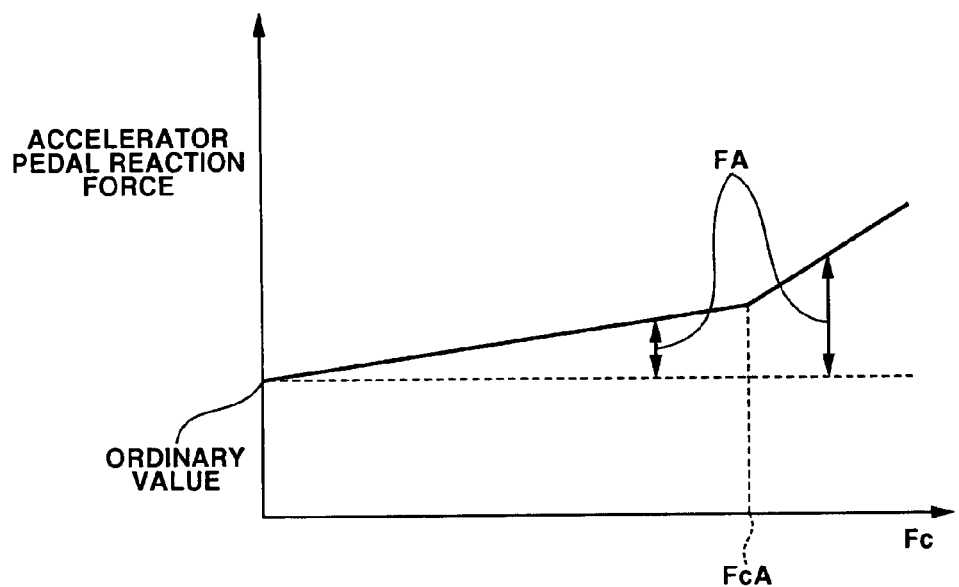
FIG. 14 shows an accelerator pedal reaction force instruction value FA changing with different values of the repulsive force Fc when the accelerator pedal is kept to a predetermined depressed position.

The fully drawn line in FIG. 14 illustrates values of the reaction force applied to the accelerator pedal 61 relative to different values of repulsive force Fc when the accelerator pedal position SA is unchanged. The broken line in FIG. 14 illustrates an ordinary value of the reaction force that remains when the regulation of reaction force is not performed, and the accelerator pedal position SA remains unchanged.

As shown in FIG. 14, the accelerator pedal reaction force instruction value FA increases as the repulsive force Fc become larger. Immediately after the repulsive force Fc exceeds a predetermined value FcA, the rate of increase of the accelerator pedal reaction force instruction value FA increases. In this manner, the reaction force applied to the accelerator pedal 61 grows as the driving force correction amount becomes larger.

At step S210, controller 50 provides the driving force correction amount ΔDa and the braking force correction amount ΔDb to the driving force regulator 60 and the braking force regulator 70, respectively. Referring to FIG. 4, the driving force regulator 60 calculates a target driving force based on the driver driving force request Fda and the driving force correction amount ΔDa, and provides the target driving force to the engine controller 60c. The engine controller 60c provides an engine control command, causing the engine to generate torque to provide the calculated target driving force. Referring to FIG. 6, the braking force regulator 70 calculates a target braking force based on the driver braking force request Fdb and the braking force correction amount ΔDb and provides the target braking force to the brake pressure controller 70c, causing the wheel cylinder to generate the calculated target braking force.

At the nest step S220, controller 50 provides the accelerator pedal reaction force instruction value FA to the accelerator pedal reaction force generator 80. The accelerator pedal reaction force generator 80 regulates the reaction force applied to accelerator pedal 61 in response to command from controller 50.

Figure 15:
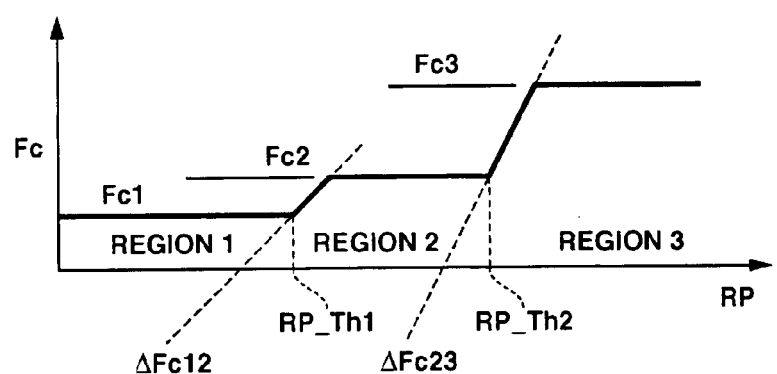
FIG. 15 shows the repulsive force Fc changing with different ranges of risk potential RP.

FIG. 15 shows an operation of the first exemplary embodiment of an exemplary driving assistance system of this disclosure. The solid line in FIG. 15 illustrates how the repulsive force Fc grows with increasing risk potential RP as host vehicle 1 approaches the preceding vehicle. As illustrated in FIG. 15, the repulsive force Fc successively assumes different values Fc1, Fc2 and Fc3 in an increasing direction as the risk potential RP falls in different regions 1, 2 and 3, with a transition rate (relative to time) ΔFc changing from one value to another.

The repulsive force Fc assumes a value Fc1 when the risk potential RP falls in range 1 (RP<RP_Th1). Responsive to the risk potential RP becoming equal to or greater than the first predetermined value RP_Th1, the range in which the risk potential RP falls shifts to range 2 from range 1 and the repulsive force Fc starts to increase gradually from Fc1 toward Fc2 at the rate of ΔFc12. Subsequently, responsive to the risk potential RP becoming equal to or greater than the second predetermine value RP_Th2, the range in which the risk potential RP falls shifts to range 3 from range 2, and the repulsive force Fc starts to increase gradually from Fc2 toward Fc3 at the rate of ΔFc23.

The driving force correction amount ΔDa, the braking force correction amount ΔDb and the accelerator pedal reaction force instruction value FA are determined or set in accordance with the repulsive force Fc. The more the repulsive force Fc grows, the more deceleration is applied to host vehicle 1, and the more the reaction force is applied to the accelerator pedal 61. As illustrated in FIG. 15, the repulsive force Fc grows by stages, a change in deceleration caused by changes in driving and braking forces and a change in risk potential RP are easily transmitted to the driver. Besides, the more the risk potential RP grows, the more the rate ΔFc grows. Thus, an increase in the risk potential RP is transmitted to the driver by the rate of change with respect to time in driving and braking force and reaction force applied to accelerator pedal 61.

If the risk potential RP drops, the repulsive force Fc drops at a gradual rate when the risk potential RP falls below the second predetermined value RP_Th2 or the first predetermined value RP_TH1.

First Modification to First Exemplary Embodiment

According to the above-described first exemplary embodiment, as shown in FIG. 15, each of regions 1, 2 and 3 has a fixed value of Fc and each has different length or net range over different values of the risk potential RP. In each of the regions, the flat section is defined as a range of different risk potential over which the repulsive force Fc remains unchanged. According to this modification to the first exemplary embodiment, the repulsive force Fc remains unchanged within each region, but the flat sections have the same length.

Figure 16:
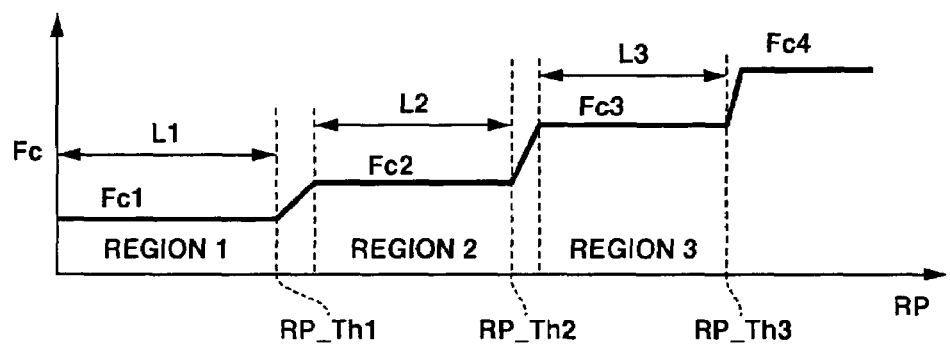
FIG. 16 shows values of the repulsive force Fc relative to different ranges of risk potential RP according to a first modification to the first exemplary embodiment.

FIG. 16 illustrates values of repulsive force Fc relative to risk potential RP as the risk potential grows. In FIG. 16, four regions are set to classify the risk potential RP. In this example, except for region 4 which covers the largest values of the risk potential RP, regions 1, 2 and 3 have flat sections, which are of substantially the same in length.

As shown in FIG. 16, the repulsive force Fc assumes a value of Fc1 when the risk potential RP falls in region 1. Region 1 has a range risk potential RP, $0 \leq RP < RP\_Th1$. Region 1 has a flat section L with a length L1. Regions 2 and 3 have flat sections with lengths L2 and L3, respectively. In order to accomplish the relationship that the lengths L1, L2 and L3 of flat sections of regions 1, 2 and 3 are equal (L1=L2=L3), threshold values RP_Th2 and RP_Th3, and the rates ΔFc12 and ΔFc23 are set or determined. It is to be remembered that RP_Th2<RP_Th3, and ΔFc12<ΔFc23. The region 4 has a repulsive force Fc4 and the rate ΔFc34. The setting is such that Fc4>Fc3 and ΔFc34>ΔFc23.

Second Modification to First Exemplary Embodiment

According to the second modification of the first embodiment, the flat sections of the ranges have lengths L varying with different values of risk potential RP.

Figure 17:
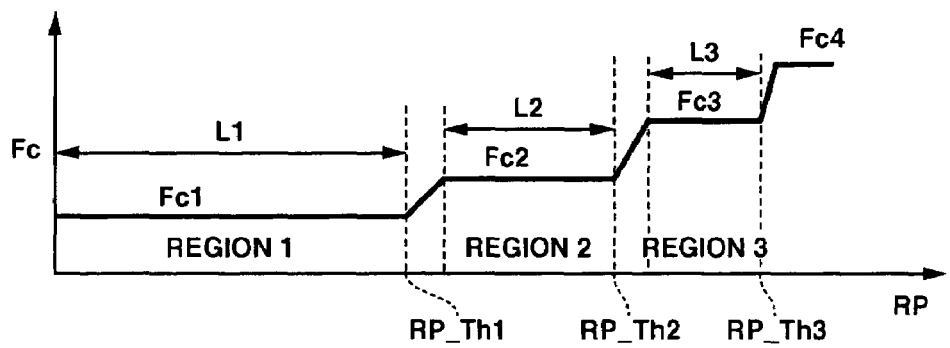
FIG. 17 shows vales of the repulsive force Fc changing with different ranges of risk potential RP according to a second modification to the first exemplary embodiment.

FIG. 17 illustrates values of repulsive force Fc relative to risk potential RP as the risk potential grows. In FIG. 17, four regions are set to classify the risk potential RP. In this example, except for region 4 which covers the largest values of risk potential RP, regions 1, 2 and 3 have flat sections, which vary in length with different values of the risk potential RP.

As shown in FIG. 17, the flat sections of ranges 1, 2 and 3 have lengths L1, L2 and L3, respectively. The lengths L1, L2 and L3 have the relationship L1>L2>L3. Threshold values RP_Th1, RP_Th2 and RP_Th3 and the rates ΔFc12 and ΔFc23 are set so as to satisfy the relationship that L1>L2>L3, wherein RP_Th1<RP_Th2<RP_Th3, and ΔFc12<ΔFc23.

The first exemplary embodiment provides the following effects:

(1) Controller 50 calculates, based on the detected obstacle, for example, the preceding vehicle and the detected status of the host vehicle, a value of risk potential RP indicative of a collision risk between the host vehicle and the preceding vehicle. Based on the calculated value of risk potential RP, a reaction force applied to the accelerator pedal 61, a driving force and a braking force are regulated. Controller 50 compares the calculated value of risk potential to a plurality of regions, each of the regions covering a portion of different values of risk potential, to determine which one of the plurality of regions that the calculated value of risk potential falls. A control parameter Fc remains unchanged within each of the regions. However, the control parameter Fc is varied during a transient period that begins immediately after the calculated risk potential changes and falls in a new region. The magnitude of the control parameter and the rate of change of the control parameter are set in response to the risk potential. In response to the change of calculated risk potential, the reaction force input applied to the accelerator pedal 61, and the driving and braking forces are varied according to the control parameter in discrete manner. The rate of change of the control parameter is varied in response to an increase in risk potential RP. As a result, as long as there is no change in region, the reaction force and driving and braking forces remain unchanged. A change in region causes a change in the reaction force and a change in the driving and braking forces. Accordingly, the change of the risk potential is clearly transmitted to the driver by a haptic input in the form a reaction force input via the accelerator pedal and a deceleration input via host vehicle 1. Thus, the driver is always kept informed of varying of risk potential around host vehicle 1.

(2) The control parameter and the rate of change in the control parameter increase as the risk potential falls in regions covering higher values of risk potential. In other words, the control parameter is in the form of a repulsive force Fc and the rate is in the form of the time rate of change of the repulsive force Fc as shown in FIG. 15, and they become large as the risk potential falls in regions covering higher values of risk potential. As the reaction force input via the accelerator pedal 61 and driving and braking forces grow, the driver is informed of the fact that the risk potential has grown.

(3) The ranges covering different risk potential RP may have the same length. As shown in FIG. 16, the lengths L1, L2 and L3 of flat sections of regions 1, 2 and 3, where the repulsive force Fc remains unchanged, are set as L1=L2=L3. In this case, the repulsive force Fc varies at a regular interval if the risk potential RP varies at the same rate. Thus, the driver can anticipate variations in the driving and braking forces and the reaction force applied to the accelerator pedal 61. Instead of setting flat sections L1, L2 and L3 in equal lengths, the ranges of the regions 1, 2 and 3 ($0 \leq RP < RP\_Th1$, $RP\_Th1 \leq RP < RP\_Th2$, $RP\_Th2 \leq RP < RP\_Th3$) may be set equal to each other. As a transitional period for each of the regions 1, 2 and 3 is insignificant comparing to the length of the flat section of the region, the same effect as that provided by setting the flat sections at equal lengths is provided by setting the ranges of the regions 1, 2 and 3 equal to each other.

(4) The lengths of the regions may vary with different values of risk potential RP. As shown in FIG. 17, the lengths L1, L2 and L3 of the flat sections of the regions 1, 2 and 3 are made shorter as the risk potential RP grows (L1>L2>L3). With this arrangement, the repulsive force Fc increases quickly when the risk potential RP becomes large so that an increase in reaction force RP is transmitted clearly to the driver by an increase in driving and braking forces and an increase in reaction force applied to accelerator pedal 61. In this case, instead of varying the flat sections of the regions, the lengths of the ranges of the regions 1, 2 and 3 ($0 \leq RP < RP\_Th1$, $RP\_Th1 \leq RP < RP\_Th2$, $RP\_Th2 \leq RP < RP\_Th3$) may be varied. The same effect as that provided by varying of the flat sections is provided by varying the ranges of the regions 1, 2 and 3.

(5) The control parameter and the rate of change are the magnitude and the rate of change in regulating driving and braking forces and reaction force applied to accelerator pedal 61. In other words, repulsive force Fc and its rate of change are set based on risk potential RP, in order to calculate driving and braking force correction amounts ΔDa and ΔDb, and an accelerator pedal reaction force instruction value FA. Thus, variation of risk potential RP is transmitted clearly to the driver.

Second Exemplary Embodiment

Figures 18, 19:
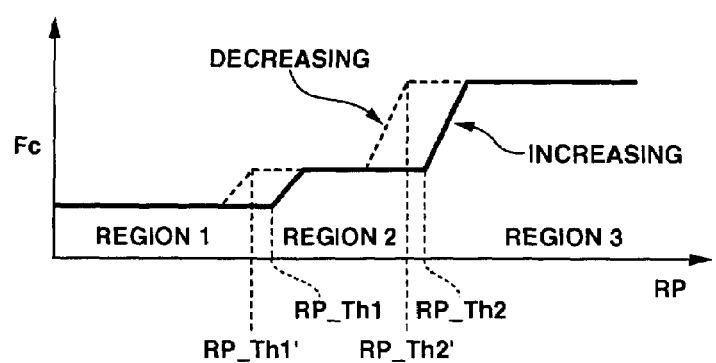
FIG. 18 is a table illustrating ranges into which a risk potential RP should be classified, according to a second exemplary embodiment.
FIG. 19 shows values of repulsive force Fc relative to different ranges of risk potential RP corresponding to an increasing risk potential; and values of repulsive force Fc relative to different ranges of risk potential RP corresponding to a decreasing risk potential, according to the second exemplary embodiment.

FIGS. 18 and 19 illustrate the second exemplary embodiment of this disclosure. The second exemplary embodiment is substantially the same as the first exemplary embodiment, but is different from the first exemplary embodiment in that regions for risk potential RP are set to provide hysteresis based on the risk potential RP. As shown in FIGS. 18 and 19, each of regions 1, 2 and 3 have two different threshold values, one corresponding to increasing risk potential RP, and the other one corresponding to decreasing risk potential RP. The threshold value RP_Th1 from range 1 to range 2 is greater than the threshold value RP_Th1' from range 2 to range 1 (RP_Th1>RP_Th1'). The threshold value RP_Th2 from range 2 to range 3 is greater than the threshold value RP_Th2' from range 3 to range 2 (RP_Th2>RP_th2'). In one embodiment, a difference between the threshold values RP_Th1 and RP_Th1' is substantially the same as a difference between the threshold values RP_Th2 and RP_Th2'.

FIG. 19 illustrates values of repulsive force Fc relative to risk potential RP. The fully drawn line illustrates changes of repulsive force Fc as risk potential RP increases. The broken line illustrates changes of repulsive force Fc as risk potential RP decreases.

If the risk potential RP increases, the repulsive force Fc increases gradually responsive to the risk potential RP becoming equal to or greater than the threshold value RP_th1 and falling into range 2 from range 1. Subsequently, the repulsive force Fc increases gradually responsive to the risk potential becoming equal to or greater than the threshold value RP_Th2, and falling into range 3 from range 2. If the risk potential RP decreases, the repulsive force Fc decreases gradually responsive to the risk potential becoming less than the threshold value RP_Th2' (<RP_Th2) and falling into range 2 from range 3. Subsequently, the repulsive force Fc decreases gradually responsive to the risk potential has becoming less than the threshold value RP_Th1' (<RP_Th1) and falling into range 1 from range 2.

With the hysteresis, a rapid drop in the repulsive force Fc is avoided by maintaining the repulsive force Fc when the risk potential RP changes in a decreasing direction immediately after it has varied in increasing direction.

Modification to Second Exemplary Embodiment

Figures 20, 21:
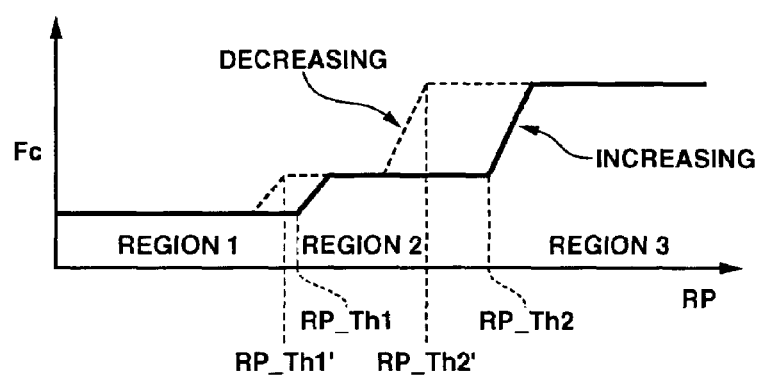
FIG. 20 illustrates a modification to the second exemplary embodiment.
FIG. 21 is a table illustrating regions into which a risk potential RP should be classified when the risk potential RP changes faster or slower than a predetermined rate according to a third exemplary embodiment.

Referring to FIG. 20, a modification of the second embodiment is illustrated. According to this modification, the hysteresis is varied in accordance with the magnitude of risk potential RP.

As shown in FIG. 20, repulsive force Fc is altered according to different values of risk potential RP. The fully drawn line illustrates values of repulsive force Fc relative to increasing risk potential RP. The broken line illustrates changes of repulsive force Fc relative to decreasing risk potential RP.

As shown in FIG. 20, the higher the risk potential RP is, the more hysteresis is provided in the increasing direction and in decreasing direction. In other words, a difference between threshold values RP_Th2 and RP_Th2' for a shift between the ranges 2 and 3 is greater than a difference between threshold values RP_Th1 and RP_Th1' for a shift between the ranges 1 and 2 (RP_Th1−RP_Th1'<RP_Th2−RP_Th2'). The larger the risk potential RP is, the longer the repulsive force Fc is maintained to prevent a rapid drop during a change of the risk potential in a decreasing direction.

In addition to the effects provided by the first exemplary embodiment, the second exemplary embodiment provides the following effects:

(1) Hysteresis is provided based on a direction of change in the classified regions of risk potential RP, that is, increasing or decreasing. In other words, as shown in FIG. 19, as the calculated risk potential decreases and its classified region changes correspondingly, the repulsive force Fc is maintained by preventing a rapid drop in the repulsive force Fc where the risk potential is high.

(2) The magnitude of hysteresis may be varied based on risk potential RP. In other words, as shown in FIG. 20, the larger the risk potential, the larger the magnitude of hysteresis. As the repulsive force Fc is maintained at a higher value longer in regions where the risk potential is high, the driving and braking force and the reaction force are maintained by preventing an unexpected rapid drop.

Third Exemplary Embodiment

Figures 22, 23:
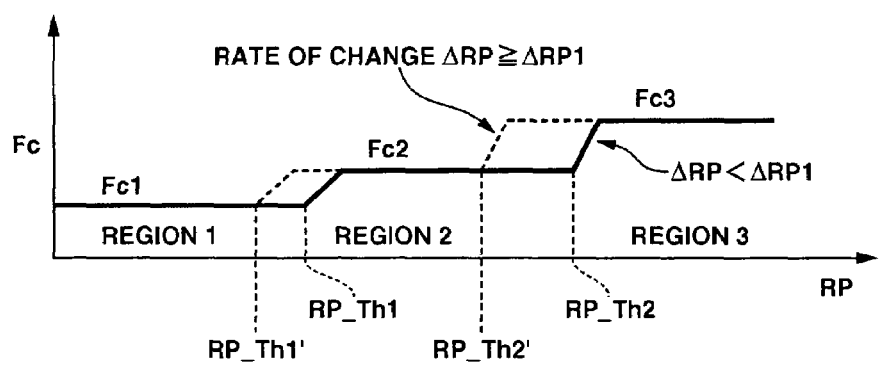
FIG. 22 shows values of repulsive force Fc relative to different ranges of risk potential RP when the risk potential RP changes faster or slower than a predetermined changing rate, according to the third exemplary embodiment.
FIG. 23 is a table illustrating regions into which a risk potential RP (in the form of a time headway THW or a time to contact TTC) should be classified according to a fourth exemplary embodiment.

FIGS. 21 and 22 illustrate a third exemplary embodiment of this disclosure. The third exemplary embodiment is substantially the same as the first exemplary embodiment, but is different from the first exemplary embodiment in that flat sections of ranges are varied in length according to a rate of change ΔRP of risk potential RP.

As shown in FIG. 21, during a transition between two adjacent regions, a first threshold value is used when the rate of change ΔRP is less than a predetermined value ΔRP1, and a second threshold value is used when the rate of change ΔRP is greater than or equal to the predetermined value ΔRP1. For a shift between ranges 1 and 2, a threshold value RP_Th1 is used when the rate of change ΔRP is less than the predetermined value ΔRP1, while a different threshold value RP_Th1' is used when the rate of change ΔRP is greater than or equal to the predetermined value ΔRP1. The relationship between the threshold values is that ΔRP_Th1>ΔRP_Th1'. For a shift between ranges 2 and 3, a threshold value RP_Th2 is used when the rate of change ΔRP is less than the predetermined value ΔRP1, while a different threshold value RP_Th2' is used when the rate of change ΔRP is greater than or equal to the predetermined value ΔRP1. The relationship between the threshold values is that ΔRP_Th2>ΔRP_Th2'.

FIG. 22 illustrates changes of repulsive force Fc relative to risk potential RP. The fully drawn line illustrates change of repulsive force Fc relative to different values of risk potential RP when the rate of change ΔRP is less than the predetermined value ΔRP1 (ordinary state). The broken line illustrates values of repulsive force Fc with respect to different values of risk potential RP when the rate of change ΔRP is greater than or equal to the predetermined value ΔRP1.

As shown in FIG. 22, the repulsive force Fc increases gradually responsive to risk potential RP becoming equal to or greater than the threshold value RP_Th1 and shifting from region 1 to region 2. Subsequently, the repulsive force Fc begins increasing gradually in response to risk potential RP becoming equal to or greater than the threshold value RP_Th2. When the rate of change ΔRP is greater than or equal to the predetermined value ΔRP1, the repulsive force Fc starts to increase gradually responsive to risk potential RP becoming equal to or greater than the threshold value RP_Th1' (<RP_Th1) and shifting from range 1 to range 2 from range 1. Subsequently, the repulsive force Fc starts to increase gradually immediately responsive to risk potential RP being equal to or greater than the threshold value RP_Th2' (<RP_Th2).

In addition to the effects provided by the first exemplary embodiment, the third exemplary embodiment provides the following effect:

The lengths of the regions are varied in response to the rate of change in risk potential RP. In other words, as shown in FIG. 22, threshold values defining each of the regions 1, 2 and 3 are varied based on a comparison of the rate of change of risk potential RP and the predetermined value ΔRP1. When the rate of change ΔRP in risk potential RP is large, the threshold values are lowered to allow an early step-up or increase. Accordingly, an increase in risk potential RP is transmitted early to the driver by a quick and early increase in driving and braking force and that in reaction force input via the accelerator pedal 61.

Fourth Exemplary Embodiment

FIGS. 23 to 27 show a fourth exemplary embodiment of this disclosure. The fourth exemplary embodiment is substantially the same as the first exemplary embodiment, but is different from the first exemplary embodiment in the manner of classifying risk potential RP into one of a plurality of ranges and also in the manner of calculating a repulsive force Fc. According to the fourth exemplary embodiment, a gain used to calculate the repulsive force Fc is altered to vary a characteristic of the repulsive force relative to the risk potential RP. The fourth exemplary embodiment employs the main control routine shown in FIG. 8. However, the fourth exemplary embodiment is different from the first exemplary embodiment in the manner of determining which one of the regions a calculated risk potential falls in, and the manner of calculating a repulsive force Fc.

At step S170 (see FIG. 8), a controller 50 calculates a time to contact TTC in equation Eq. 3 and a time headway THW in equation Eq. 4, and use the calculated TTC and the calculated headway THW as different risk potentials. Controller 50 classifies these risk potentials into one of ranges 1, 2 and 3. FIG. 23 illustrates the relationship between each of the time headway THW and time to contact TTC and ranges 1, 2 and 3.

As shown in FIG. 23, controller 50 sets region 1 if the time headway THW is greater than a first threshold value THW_Th1, which indicates that risk potential RP is low. Controller 50 sets region 2 if the time headway THW is greater than a second threshold value THW_Th2 but less than or equal to the first threshold value THW_Th1, which indicates that risk potential RP is intermediate. Controller 50 sets region 3 if the time headway THW is less than or equal to the second threshold value THW_Th2, which indicates that risk potential RP is high.

Controller 50 sets region 1 if the time to contact TTC is greater than a first threshold value TTC_Th1, which indicates that risk potential RP is low; and sets region 2 if the time to contact TTC is greater than a second threshold value TTC_Th2 but less than or equal to the first threshold value TTC_Th1, which indicates that risk potential RP is intermediate. Controller 50 sets region 3 if the time headway TTC is less than or equal to the second threshold value TTC_Th2, which indicates that risk potential RP is high.

If different regions are set according to the time headway THW and time to contact TTC, controller 50 selects one of them with a higher risk potential RP. For example, if region 1 is set according to the time headway THW and region 2 is set according to the time to contact TTC, controller 50 selects region 2.

Figure 24:
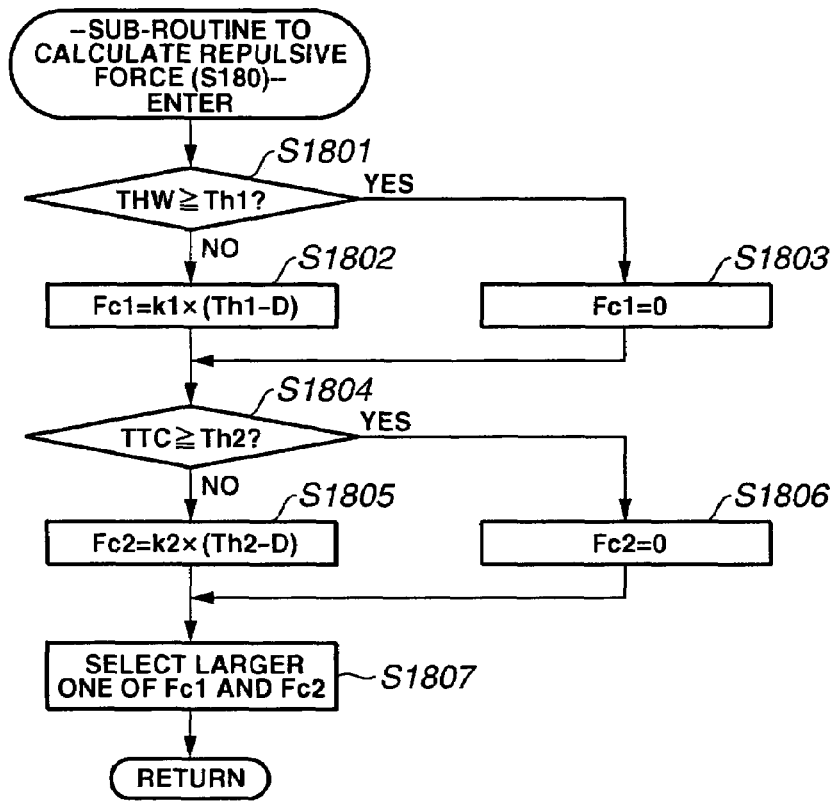
FIG. 24 is a flow chart illustrating the operation of the fourth exemplary embodiment.

At the next step S180 (see FIG. 8), controller 50 calculates the repulsive force Fc by executing a sub-routine shown in FIG. 24.

Figure 25A:
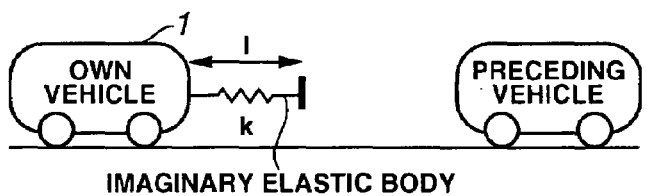
FIG. 25A is a traffic scene in which an imaginary elastic body attached to a host vehicle is following the preceding vehicle.
Figure 25B:
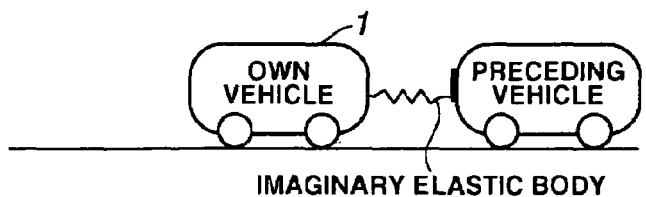
FIG. 25B is a traffic scene in which the host vehicle approaches the preceding vehicle, in which the imaginary elastic body contacts the preceding vehicle.

With reference to FIGS. 25A and 25B, the manner of determining the repulsive force Fc is described. One may consider a model with an assumption that an imaginary elastic body is provided at the front of host vehicle 1. The imaginary elastic body is compressed between the preceding vehicle and host vehicle 1 after they contact each other as illustrated in FIG. 25B. The repulsive force Fc is defined as a repulsive force applied to host vehicle I as the elastic body is compressed. In FIG. 25A, the imaginary elastic body is illustrated as having an unstressed length of 1 (el) and a spring constant k.

In this exemplary embodiment, an imaginary elastic body is assumed to be in connection with the time headway THW and is provided between host vehicle 1 and the preceding vehicle. A repulsive force applied to host vehicle I by this imaginary elastic body is calculated as a repulsive force Fc1 based on the time headway THW. Another imaginary elastic body is assumed to be in connection with the time to contact TTC and is provided between host vehicle 1 and the preceding vehicle. A repulsive force applied to this imaginary elastic body is calculated as a repulsive force Fc2 based on the time to contact TTC.

In FIG. 24, at step S1801, controller 50 determines whether or not the time headway THW is greater than or equal to a threshold value Th1 (for example, 1 second). If the time headway THW is less than the threshold value Th1 (THW<Th1), the routine proceeds to step S1802. At step S1802, controller 50 calculates the repulsive force Fc1 based on the time headway THW using the following equation:

$$Fc1 = k1 \cdot (Th1 - D) \tag{Eq. 7}$$

In equation Eq. 7, D is an inter-vehicle distance between host vehicle 1 and the preceding vehicle, and k1 is a spring constant of the imaginary elastic body set in association with the time headway THW. The spring constant k1 is a gain that determines the characteristic of the repulsive force Fc1, and is set according to the range of risk potential RP. If, at step S1801, the time headway THW is greater than or equal to the threshold value Th1, the routine proceeds to step S1803. At step S1803, controller 50 sets the repulsive force Fc1 equal to 0 (Fc1=0).

At the next step S1804, controller 50 determines whether or not the time to contact TTC is greater than or equal to a threshold value Th2 (for example, 10 seconds). If the time to contact TTC is less than the threshold value Th2 (TTC<Th2), the routine proceeds to step S1805. At step S1805, controller 50 calculates the repulsive force Fc2 based on the time to contact TTC using the following equation:

$$Fc2 = k2 \cdot (Th2 - D) \tag{Eq. 8}$$

In the equation Eq. 8, k2 is a spring constant of the imaginary elastic body set in association with the time to contact TTC. The spring constant k2 is a gain that determines the characteristic of the repulsive force Fc2, and it is set according to the range of risk potential RP. If, at step S1804, the time to contact TTC is greater than or equal to the threshold value Th2, the routine proceeds to step S1806. At step S1806, controller 50 sets the repulsive force Fc2 equal to 0 (Fc2=0).

At the next step S1807, controller 50 selects a larger one of the repulsive forces Fc1 and Fc2, and provides the selected one as a final repulsive force Fc.

Figures 26, 27:
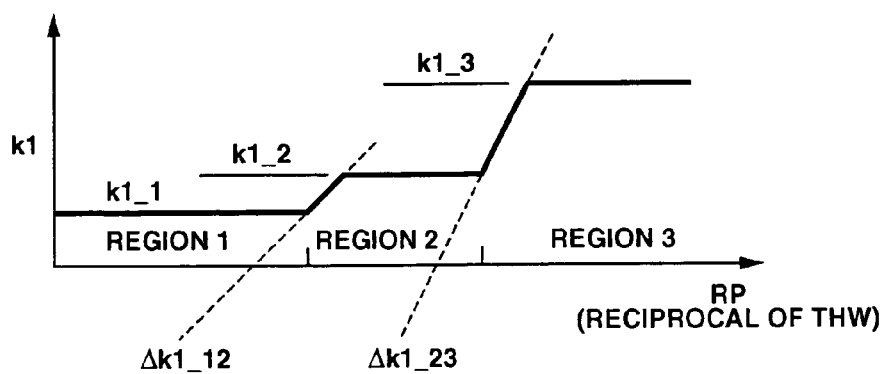
FIG. 26 is a table illustrating values of control parameters in the form of gains k1 and k2 relative to different regions and different transient periods according to the fourth exemplary embodiment.
FIG. 27 shows values of gain k1 relative to different ranges of risk potential RP according to the fourth exemplary embodiment.

FIG. 26 shows the relationship between each of ranges 1, 2 and 3 and gains k1 and k2. As shown in FIG. 26, region 1 sets gain k1=k1_1 and gain k2=k2_1; region 2 sets gain k1=k1_2 and gain k2=k2_2; and region 3 sets gain k1=k1_3 and gain k2=k2_3. The relationship is that k1_1<k1_2<k1_3, and k2_1<k2_2<k2_3.

During a transient period between the adjacent two regions, the gains k1 and k2 are varied at predetermined rates Δk1 and Δk2 in the manner as expressed by the following equation:

From the present region 1 to the new region 2:
$$k1 = k1\_1 + \Delta k1\_12 \cdot T$$

$$k2 = k2\_1 + \Delta k2\_12 \cdot T$$

From the present region 2 to the new region 1:
$$k1 = k1\_2 - \Delta k1\_12 \cdot T$$

$$k2 = k2\_2 - \Delta k2\_12 \cdot T$$

From the present region 2 to the new region 3:
$$k1 = k1\_2 + \Delta k1\_23 \cdot T$$

$$k2 = k2\_2 + \Delta k2\_23 \cdot T$$

From the present region 3 to the new region 2:
$$k1 = k1\_3 - \Delta k1\_23 \cdot T$$

$$k2 = k2\_3 - \Delta k2\_23 \cdot T \quad \text{(Eq. 9)}$$

The rate $\Delta k1\_12$ indicates a change of gain k1 with respect to time during a transient period between range 1 and range 2, rate $\Delta k2\_12$ indicates a change of the gain k2 with respect to time during the transient period between range 1 and range 2, rate $\Delta k1\_23$ indicates a change of the gain k1 with respect to time during a transient period between range 2 and range 3, and rate $\Delta k2\_23$ indicates a change of the gain k2 with respect to time during the transient period between range 2 and range 3. The relationship is that $\Delta k1\_12 < \Delta k1\_23$, and $\Delta k2\_12 < \Delta k2\_23$. In equation Eq. 9, T is a period of time when a calculated risk potential starts to change from one range to another.

Using gains k1 and k2 that have been set relative to the selected range of risk potential RP as shown in FIG. 26, the repulsive forces Fc1 and Fc2 are calculated using equations Eq. 7 and Eq. 8. FIG. 27 shows values of gain k1 relative to different values of risk potential RP. In FIG. 27, the horizontal axis represents the reciprocal of time headway THW.

As shown in FIG. 27, region 1 provides the setting that the gain k1=k1_1. Responsive to the risk potential RP indicated by the reciprocal of the time headway THW falling into range 2 from range 1, gain k1 increases gradually toward a value of k1_2 at the rate $\Delta k1\_12$. Subsequently, in response to the reciprocal of the time headway THW falling into range 3 from range 2, the gain k1 increases gradually toward a value of k1_3 at the rate $\Delta k1\_23$. The gain k1 is fixed at the values k1_2 and k1_3 upon completion of the transient periods after the reciprocal of the time headway THW had fallen into the ranges 2 and 3, respectively.

Changing the value of gain k2 with different values of the reciprocal of time to contact TTC is similar to the way that gain k1 is changed as shown in FIG. 27.

Modification to Fourth Exemplary Embodiment

Figure 28:
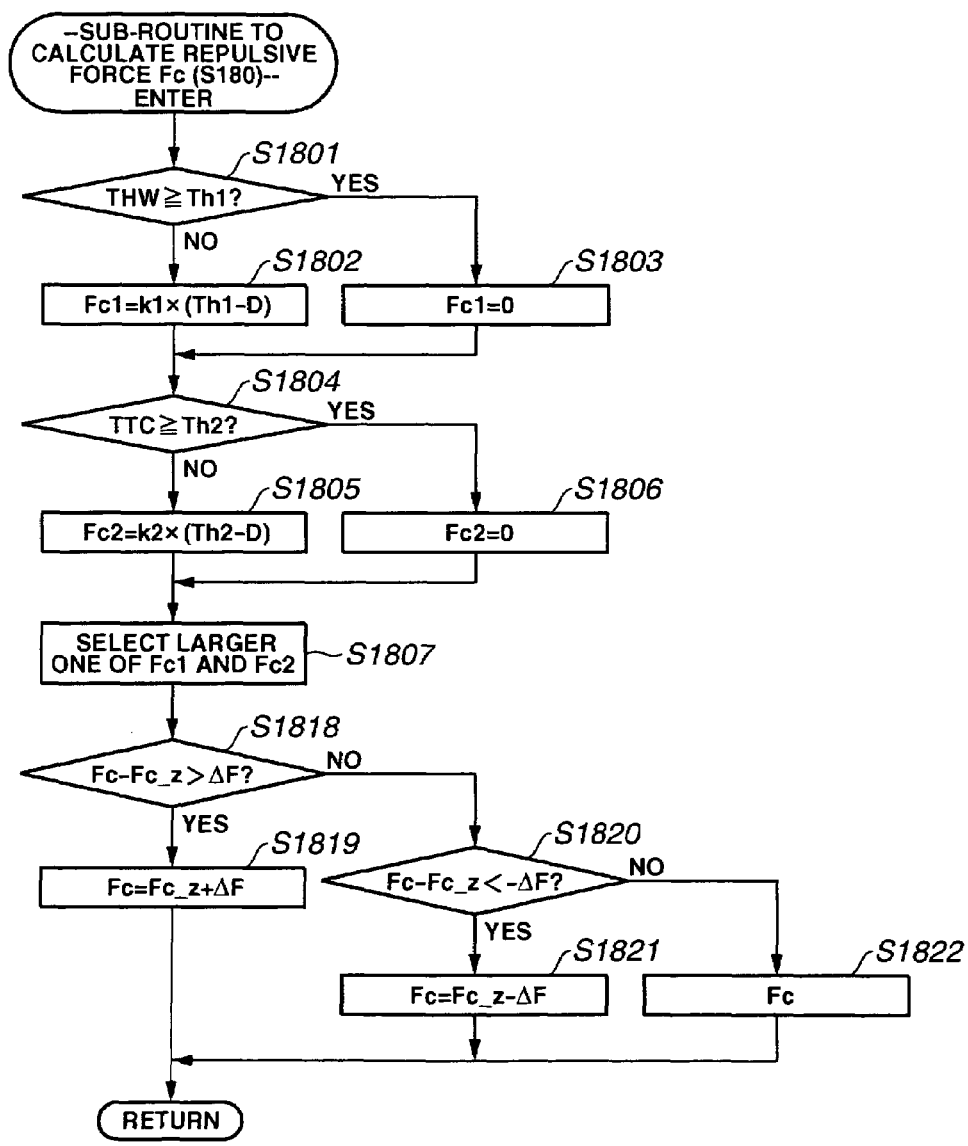
FIG. 28 is a flow chart illustrating the operation of a modification to the fourth exemplary embodiment.

FIGS. 28 and 29 show modifications of the fourth embodiment. Instead of gradually varying gains k1 and k2 during a transient period, the repulsive force Fc is gradually varied by a variation limiter. The flow chart in FIG. 28 is a sub-routine to be executed at the step S180 of the flow chart shown in FIG. 8. The flow chart in FIG. 28 is substantially the same as that of FIG. 24. Like reference numerals are used throughout FIGS. 24 and 28 to designate like steps.

The flow chart in FIG. 28 is substantially the same as that of FIG. 24 in that both have steps S1801, S1802, S1803, S1804, S1805, S1806 and S1807, but the former is different from the latter in new steps S1818, S1819, S1820, S1821 and S1822.

In FIG. 28, after determining the repulsive force Fc at step S1807, the routine proceeds to step S1818. At step S1818, a controller 50 determines whether or not a difference between the present value of repulsive force Fc determined at step S1807 and the last value of repulsive force Fc_z, (Fc−Fc_z) is greater than a variation $\Delta F$. The variation $\Delta F$ is set in response to selected one of regions of risk potential RP. FIG. 29 shows the relationship between each of the regions 1, 2 and 3 and gains k1 and k2 of repulsive forces Fc1 and Fc2 and the variation $\Delta F$ (limit rate of change).

As shown in FIG. 29, region 1 sets gain k1=k1_1, gain k2=k2_1, and variation $\Delta F=\Delta F\_1$. Region 2 sets gain k1=k1_2, gain k2=k2_2, and variation $\Delta F=\Delta F\_2$. Region 3 sets gain k1=k1_3, gain k2=k2_3, and variation $\Delta F=\Delta F\_3$. Gains k1 and k2 used in calculating the repulsive forces Fc1 and Fc2 do not change during a transient period. Instead of varying gains k1 and k2 during the transient period, the variation $\Delta F$ assumes one of values $\Delta F\_1$, $\Delta F\_2$ and $\Delta F\_3$ in response to the selected one of the ranges 1, 2 and 3.

At step S1818, controller 50 determines whether or not the difference (Fc−Fc_z) between the present value of reaction force Fc and the last value of reaction force Fc_z is greater than the variation $\Delta F$ that may assume one of different values in response to the range into which the risk potential RP falls. The difference (Fc−Fc_z) is compared to the variation $\Delta F\_1$ when the risk potential RP falls in region 1 or to the variation $\Delta F\_2$ when the risk potential RP falls in region 2 or to the variation $\Delta F\_3$ when the risk potential falls in region 3.

If, at step S1818, the interrogation results in affirmative, the routine proceeds to step S1819. At step S1819, controller 50 adds the variation $\Delta F$ to the last value of repulsive force Fc_z to give the repulsive force Fc.

If, at step S1818, the interrogation results in negative, the routine proceeds to step S1820. At step S1820, controller 50 determines whether or not the difference (Fc−Fc_z) is less than $-\Delta F$. If the interrogation at step S1820 is affirmative, the routine proceeds to step S1821. At step S1821, controller 50 subtracts the variation $\Delta F$ from the last value of repulsive force Fc_z to give the repulsive force Fc.

If the interrogation at step S1820 is negative, the routine proceeds to step S1822. At step S1822, controller 50 provides the present value of repulsive force Fc obtained at step S1807 as the repulsive force Fc.

In addition to the effects provided by the first exemplary embodiment, the fourth exemplary embodiment provides the effects as follows:

(1) The control parameter and the rate of change in the control parameter are a gain used in calculating a control force and the rate of change in the gain, respectively. In other words, as shown in FIGS. 25(a) and 25(b), an imaginary elastic body is provided at the front of host vehicle 1. A repulsive force Fc, which is generated when the imaginary elastic body is compressed, is calculated by setting spring constants k1 and k2 of the imaginary elastic body. In this case, gains k1 and k2 and rates of change $\Delta k1$ and $\Delta k2$ are set based on the risk potential RP. Using gains k1 and k2 that are set in response to the ranges for risk potential RP, the repulsive force Fc is calculated. Thus, variations in risk potential RP are clearly transmitted to the driver by regulating the driving and braking forces and reaction force by the repulsive force Fc.

(2) Gains k1 and k1 are coefficients used in equations Eq. 7 and Eq. 8. As shown in FIG. 27, the higher the risk potential RP is, the more the gains k1 and k2 grow in step-like manner. As the repulsive force Fc grows in response to an increase in risk potential RP, the increase in risk potential RP is clearly transmitted to the driver.

(3) The repulsive force Fc is calculated based on the distance D and the gains k1 or k2 when the THW or TTC is less than the threshold Th1 or Th2. In other words, as shown in equations Eq. 7 and Eq. 8, the repulsive force Fc is a repulsive force of the imaginary elastic body. Regulating the driving and braking force provides an appropriate deceleration input to the driver to transmit the magnitude of risk potential to the driver.

Fifth Exemplary Embodiment

Figure 30:
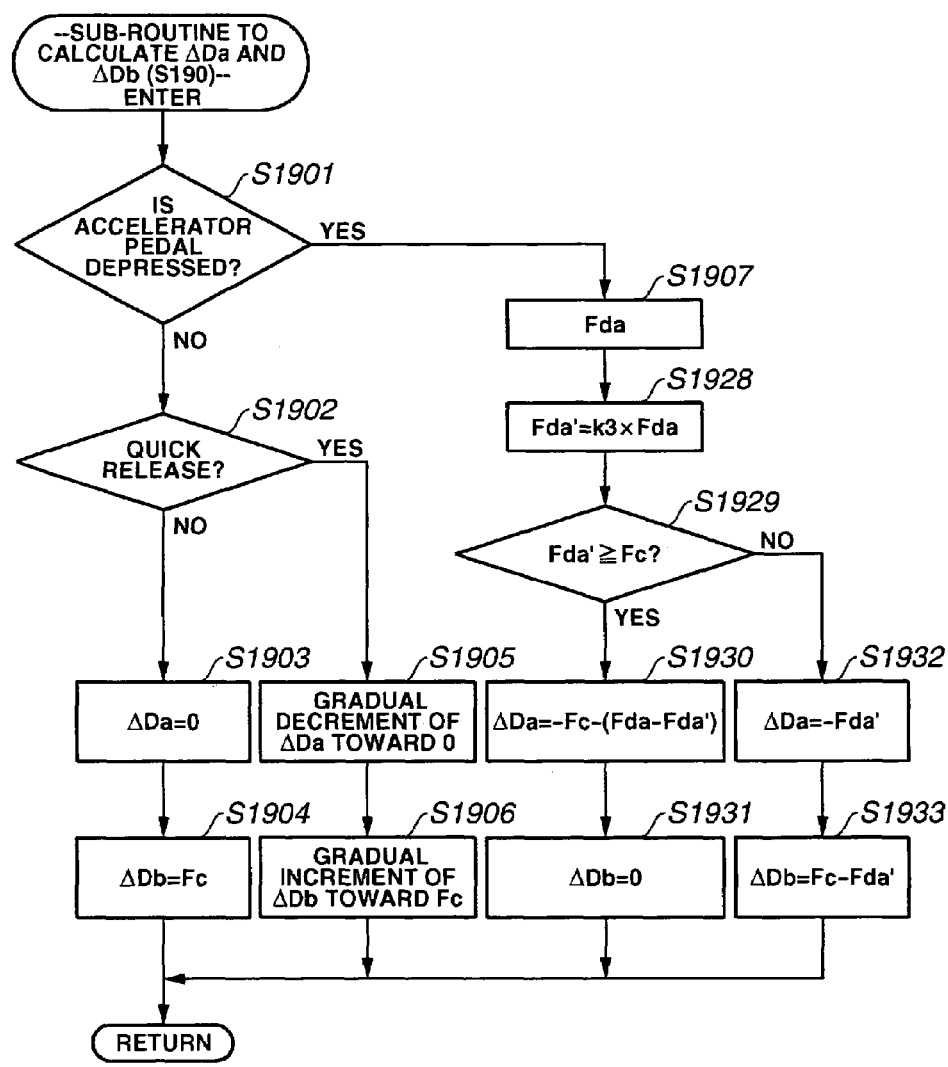
FIG. 30 is a flow chart of a sub-routine similar to that shown in FIG. 13, illustrating the operation of a fifth exemplary embodiment.

Referring to FIGS. 30 and 31, the fifth exemplary embodiment is described. The fifth exemplary embodiment is substantially the same as the first exemplary embodiment in hardware, and is described by pointing out differences from the fourth exemplary embodiment.

In the fifth exemplary embodiment, the manner to classify risk potential RP into one of regions, and the manner to calculate a repulsive force Fc are similar to those of the fourth exemplary embodiment. According to the fifth exemplary embodiment, a driver driving force request Fda that is determined based on the accelerator pedal position SA is lowered by correction based on the region in which the risk potential RP falls. The repulsive force Fc and the corrected driver driving force request Fda are used to calculate driving and braking force correction amounts $\Delta Da$ and $\Delta Db$. Referring to the flow chart in FIG. 30, the calculations of the driving and braking force correction amounts $\Delta Da$ and $\Delta Db$ are described. The flow chart in FIG. 30 illustrates a subroutine to be executed at step S190 in FIG. 8.

The flow chart in FIG. 30 is substantially the same as the flow chart in FIG. 13. Like reference numerals are used throughout FIGS. 13 and 30 to designate like steps. The flow charts in FIG. 13 and FIG. 30 are substantially the same in that they both have steps S1901, S1902, S1903, S1904, S1905, S1906 and S1907.

At step S1928, a controller 50 corrects a driver driving force request Fda determined at step S1907 to provide a corrected driver driving force request Fda', which may be expressed as:

$$Fda' = k3 \cdot Fda \qquad \text{(Eq. 10)}$$

In the equation Eq. 10, k3 is a gain (or a coefficient) used to correct the driver driving force request Fda in response to risk potential RP. Gain k3 is set based on a region into which the risk potential falls according to FIG. 31 ($0 \leq k3 \leq 1$).

Region 1 sets gain k3=k3_1. Region 2 sets gain k3=k3_2. Region 3 sets gain k3=k3_3. The relationship is that $0 \leq k3\_3 < k3\_2 < k3\_1 \leq 1$.

During a transient period between the adjacent regions, gain k3 is varied at a predetermined rate $\Delta k3$ in the manner as expressed by the following equation.

From the present region 1 to the new region 2:
$k3 = k3\_1 + \Delta k3\_12 \cdot T$ From the present region 2 to the new region 1:
$k3 = k3\_2 - \Delta k3\_12 \cdot T$ From the present region 2 to the new region 3:
$k3 = k3\_2 + \Delta k3\_23 \cdot T$ From the present region 3 to the new region 2:
$k3 = k3\_3 - \Delta k3\_23 \cdot T$ \qquad (Eq. 11)

In equation Eq. 11, rate $\Delta k3\_12$ indicates a rated of change of gain k3 with respect to time during a transient period between range 1 and range 2, and rate $\Delta k\_23$ indicates a rate of change of the gain k3 with respect to time during a transient period between range 2 and range 3. The relationship is that $\Delta k3\_12 < \Delta k3\_23$. In equation Eq. 11, T is a period of time starting from the risk potential changing from one range to another.

At the next step S1929, controller 50 determines whether or not the corrected driver driving force request Fda' is greater than or equal to the repulsive force Fc. If this is the case, the routine proceeds to step S1930.

At step S1930, controller 50 calculates the driving force control amount $\Delta Da$ by using the following equation:

$$\Delta Da = -Fc - (Fda - Fda') \qquad \text{(Eq. 12)}$$

Providing the driving force correction amount $\Delta Da$ expressed by the equation Eq. 12 to the driving force regulator 60 causes the driving force regulator 60 to generate torque that results from subtracting the driving force correction amount $\Delta Da$ from the driver driving force request Fda. The torque generated is expressed as:

$$\begin{aligned} Fda - \Delta Da &= Fda - Fc - (Fda - Fda') \\ &= Fda' - Fc \\ &= k3 \cdot Fda - Fc \end{aligned} \qquad \text{(Eq. 13)}$$

Equation Eq. 13 clearly shows that a value of torque resulting from subtracting a repulsive force Fc from a product (k3·Fda) is generated for a host vehicle. Gain k3 is restrained as $0 \leq k3 \leq 1$. Under a condition when the risk potential RP has grown, gain k3 assumes a small value, thus making it difficult to transmit the accelerator pedal position SA to the engine. If gain k3 is set equal to zero when risk potential RP falls in the high RP region, the vehicle is subject to deceleration irrespective of the accelerator pedal position SA.

In FIG. 30, steps S1931, S1932 and S1933 are substantially the same as the steps S1910, S1911 and S1912 of the flow chart in FIG. 13. However, the corrected driver driving force request Fda' is used instead of the driver driving force request Fda.

In addition to the effects provided by the first exemplary embodiment, the fifth exemplary embodiment provides the following effect:

The control parameter and the rate of change in the control parameter are gain and the rate of change in the gain used to calculate a control force in regulating driving and braking forces and reaction forces. In other words, the gain is gain k3 used to correct the driver driving force request Fda. Gain k3 is set such that it decreases as risk potential RP grows. Thus, the corrected driver driving force request becomes small as the risk potential RP grows. This means a drop in acceleration corresponding to a driver power input via accelerator pedal. Thus, an increase in risk potential RP is clearly transmitted to the driver by a drop in acceleration.

Sixth Exemplary Embodiment

Figures 33, 34:
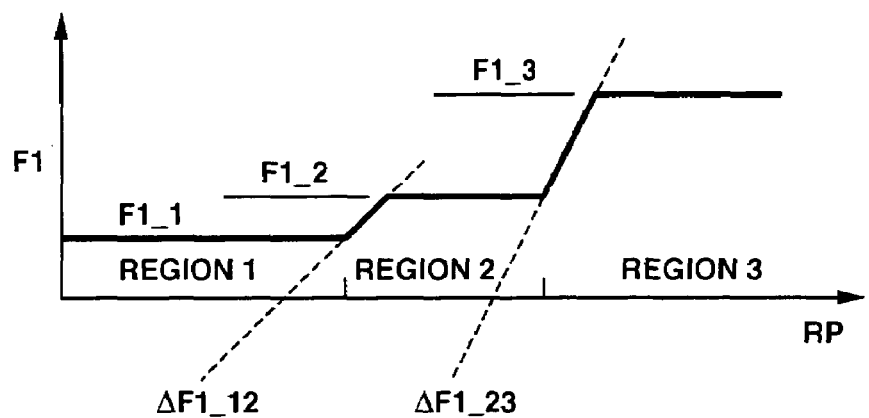
FIG. 33 shows values of the upper limit F1 relative to different ranges of risk potential RP according to the sixth exemplary embodiment.
FIG. 34 is a table illustrating various values of control parameters in the form of the upper limit F1 and variance ΔF with different regions and with different transient periods according to a modification to the sixth exemplary embodiment.

Referring to FIGS. 32 and 33, the sixth exemplary embodiment is described. The sixth exemplary embodiment is substantially the same as the first exemplary embodiment in hardware. The sixth exemplary embodiment is described by pointing out differences between the sixth embodiment and the fourth exemplary embodiment.

In the sixth exemplary embodiment, the manner of classifying risk potential RP into one of regions and the manner of calculating a repulsive force Fc are similar to those of the fourth exemplary embodiment. According to the sixth exemplary embodiment, the calculated repulsive force Fc is limited by the an upper bound F1, which is set in response to one of the ranges into which risk potential RP falls. FIG. 32 illustrates the relationship between each of the regions and the upper bound F1 of repulsive force Fc.

As shown in FIG. 32, region 1 sets the upper bound F1=F1_1, region 2 sets the upper bound F1=F1_2, and region 3 sets the upper bound F1=F1_3. The relationship is that F1_1<F1_2<F1_3.

During a transient period between the adjacent regions, gain k3 is varied at a predetermined rate Δk3 in the manner as expressed by the following equations.

From the present region 1 to the new region 2:
$$F1 = F1\_1 + \Delta F1\_12 \cdot T$$

From the present region 2 to the new region 1:
$$F1 = F1\_2 - \Delta F1\_12 \cdot T$$

From the present region 2 to the new region 3:
$$F1 = F1\_2 + \Delta F1\_23 \cdot T$$

From the present region 3 to the new region 2:
$$F1 = F1\_3 - \Delta F1\_23 \cdot T \quad \text{(Eq. 14)}$$

In equation Eq. 14, the rate ΔF1_12 indicates a change of the upper bound F1 with respect to time during a transient period between range 1 and range 2, and the rate ΔF1_23 indicates a change of the upper bound F1 with respect to time during a transient period between range 2 and range 3. The relationship is that ΔF1_12<ΔF1_23. In the equation Eq. 14, T is a period of time that the risk potential shifts from one range into another.

FIG. 33 shows values of the upper bound of the repulsive force F1 relative to different values of risk potential RP. In FIG. 33, the risk potential RP is represented by the reciprocal of time headway THW or the time to contact TTC. As shown in FIG. 33, region 1 sets the upper bound F1=F1_1. Responsive to the risk potential RP falling into range 2 from range 1, the upper bound F1 increases toward a value of F1_2 from a value of F1_1 gradually at the rate ΔF1_12. Subsequently, in response to the risk potential RP shifting into range 3 from range 2, the upper bound F1 increases toward a value of F1_3 from the value of F1_2 gradually at the rate ΔF1_23. The upper bound F1 is fixed at the values F1_1, F1_2 and F1_3 upon completion of the transient periods after the risk potential RP shifts into the ranges 1, 2 and 3, respectively.

Modification to Sixth Exemplary Embodiment

Referring to FIG. 34, the modification to the sixth exemplary embodiment is described. According to the modification, instead of varying the upper bound F1 of the repulsive force Fc during a transient period, the repulsive force Fc is limited by a variance ΔF. FIG. 34 shows the relationship between each of regions 1, 2 and 3 of risk potential RP and the upper bound F1 of repulsive force Fc and the variance ΔF (limit rate of change) of repulsive force Fc.

As shown in FIG. 34, region 1 sets the upper bound F1=F1_1, region 2 sets the least bound F1=F1_2, and region 3 sets the upper bound F1=F1_3. In region 1, the variance ΔF=ΔF_1. In region 2, the variance ΔF=ΔF_2. In region 3, the variance ΔF=ΔF_3. Limiting process of the repulsive force Fc by the variance ΔF is the same as that illustrated in FIG. 28.

In addition to the effects provided by the first exemplary embodiment, the sixth exemplary embodiment provides the following effect:

The control parameter and the rate of change in the control parameter are the least upper bound and the limit rate of change (variance) used in regulation of driving and braking forces and reaction force. In other words, as shown in FIG. 33, the upper bound F1 of the repulsive force Fc and the variance ΔF1 are varied based on the risk potential RP. In response to increase of risk potential RP, the upper bound F1 of the repulsive force Fc increases in step-like manner, making it possible to clearly transmit the increase in risk potential to the driver.

Seventh Exemplary Embodiment

Figure 35:
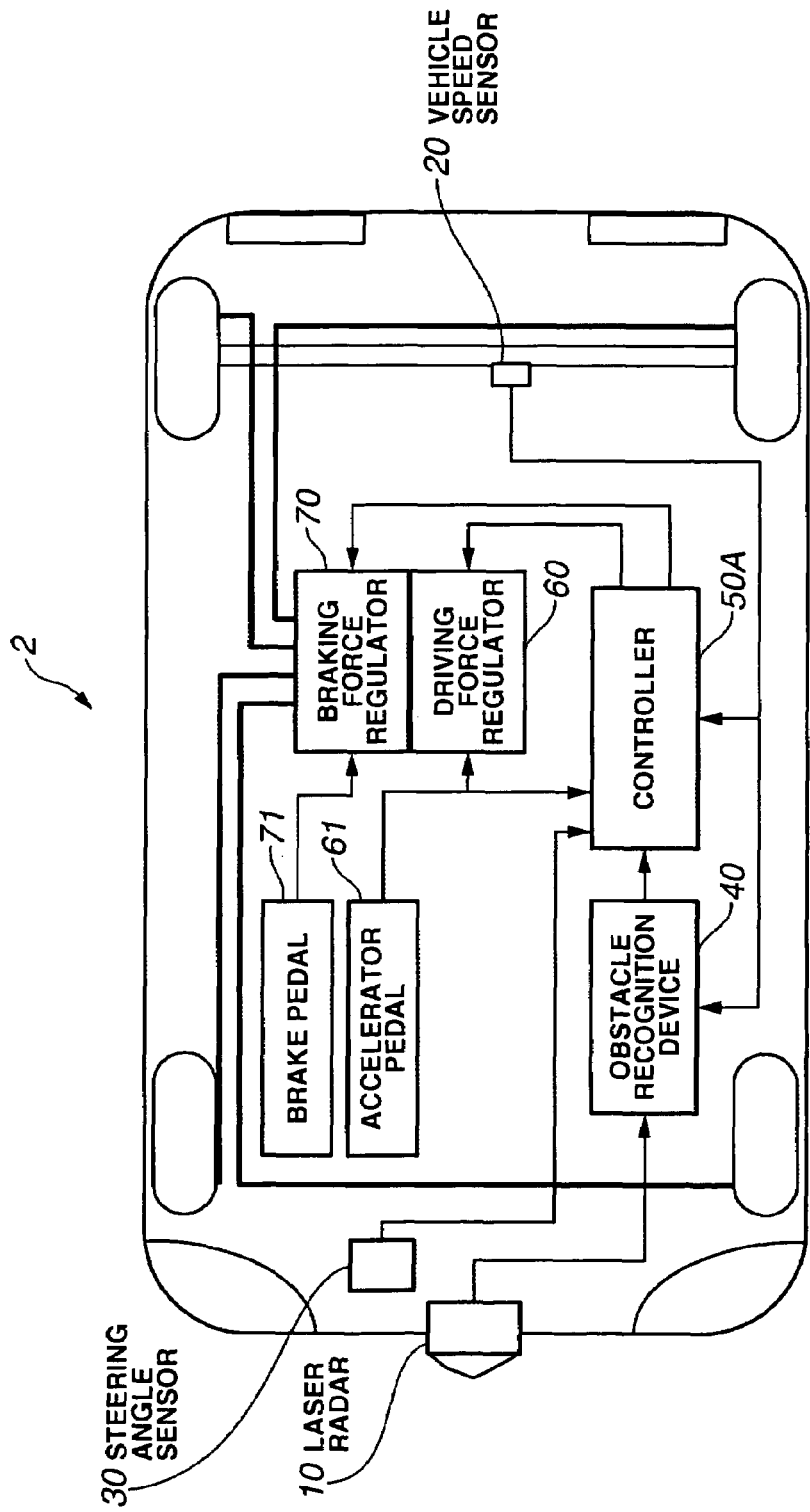
FIG. 35 illustrates a seventh exemplary embodiment.
Figure 36:
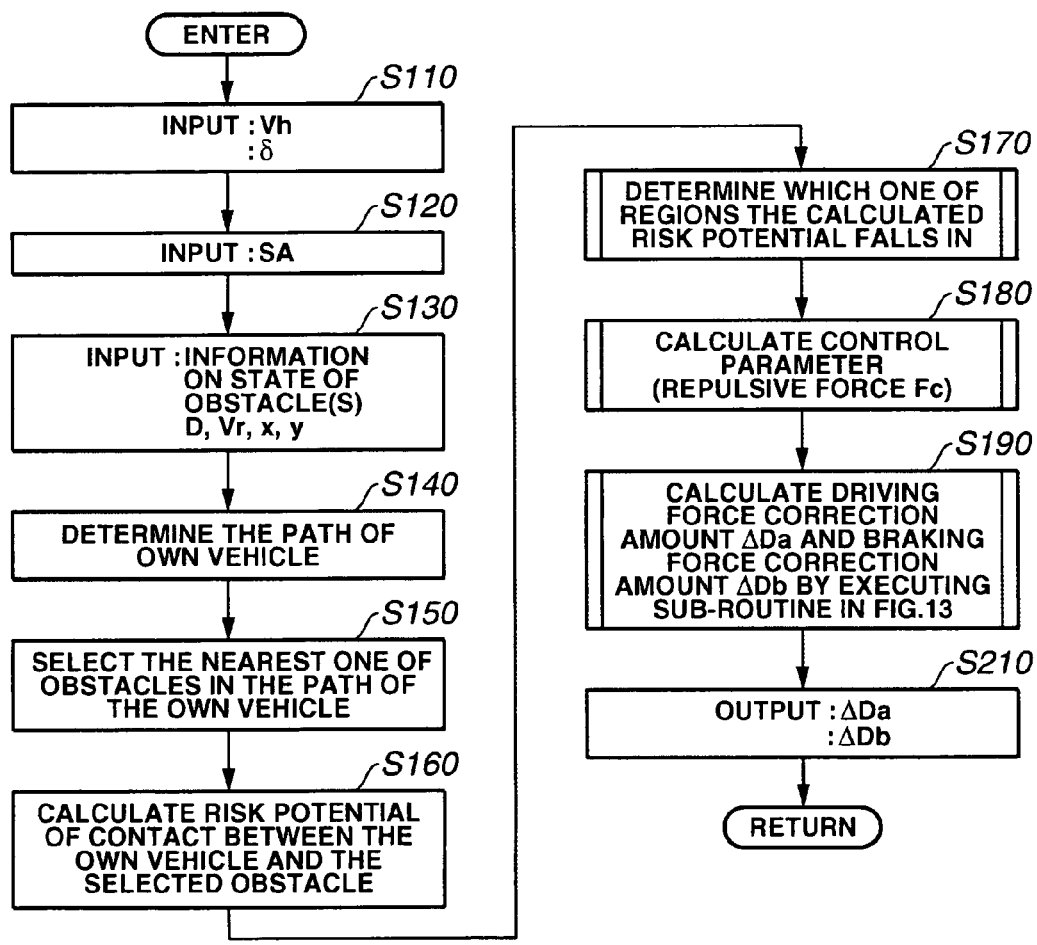
FIG. 36 is a flow chart illustrating the operation of the seventh exemplary embodiment.

Referring to FIGS. 35 and 36, the seventh exemplary embodiment of a system according to the present disclosure is described. FIG. 35 shows a vehicle 2 installed with the seventh embodiment of the system. Vehicle 2 shown in FIG. 35 is substantially the same as that shown in FIG. 1. Like reference numerals are used throughout FIGS. 1 and 35 to designate like portions and/or parts. The seventh exemplary embodiment is substantially the same as the first exemplary embodiment. However, the seventh exemplary embodiment is different from the first exemplary embodiment in the following respects.

Comparing FIG. 35 with FIG. 1 clearly reveals that the seventh exemplary embodiment is not provided with an accelerator pedal reaction force generator 80. In the seventh exemplary embodiment, under control of a controller 50A, a driving force regulator 60 and a braking force regulator 70 regulate a driving force and a braking force applied to the vehicle 2, respectively, to address increased collision risks between host vehicle 2 and the preceding vehicle.

The flow chart in FIG. 36 illustrates the operation of the seventh exemplary embodiment. The flow chart in FIG. 36 is substantially the same as that shown in FIG. 8. However, the flow chart in FIG. 36 is different from that in FIG. 8 in that the flow chart in FIG. 36 is not provided with steps corresponding to the steps S200 and S220 of the flow chart in FIG. 8. In FIG. 36, after calculating driving and braking force correction amounts ΔDa and ΔDb at step S190, controller 50A provides the driving and braking force correction amounts ΔDa and ΔDb to the driving and braking force regulators 60 and 70, respectively. Different from the first exemplary embodiment shown in FIGS. 1 and 8, the seventh exemplary embodiment shown in FIGS. 35 and 36 does not transmit a risk potential RP associated with the host vehicle 2 to the driver by a reaction force input via an accelerator pedal 61. According to the seventh exemplary embodiment, the risk potential RP is transmitted clearly and effectively to the driver by driving and braking forces that changes with different ranges for the risk potential RP.

In the first exemplary embodiment, the accelerator pedal reaction force generator 80 is provided to transmit risk potential RP to the driver by a reaction force input via the accelerator pedal 61. In each of the second to sixth exemplary embodiments, the transmission of the risk potential to the driver by reaction force applied to accelerator pedal 61 may be eliminated or may be made inoperable.

In each of the first to seventh exemplary embodiments, three or four regions are set for classification of risk potential RP to provide different distinct levels of control parameter such as a repulsive force Fc or gains k1 and k2 used to calculate the repulsive force Fc. The number of regions is not limited to the illustrated example of three or four. For example, two or more than four regions may be set for classification of risk potential RP. In this case, the regions for higher risk potential provide increased levels of repulsive force Fc or gains k1 and k2 to calculate the risk potential Fc. The higher the risk potential classified into a region, the higher is the rate of change during a transient period to the region.

In each of the first to sixth exemplary embodiments, the reaction force input via the accelerator pedal 61 is regulated in response to the control parameter in the form of repulsive force Fc calculated based on risk potential RP around vehicle 1 in order to transmit the risk potential to the driver. In order to transmit the risk potential RP to the driver, it is possible to regulate a reaction force input via the brake pedal 71 in addition to the regulation of the reaction force input via the accelerator pedal 61.

In each of the first to third exemplary embodiments, the time headway THW and time to contact TTC between the host vehicle and the preceding vehicle are used to calculate a risk potential RP. This is just one of various examples of calculating the risk potential RP. For example, the reciprocal of TTC may be used as the risk potential RP.

In each of the fourth to sixth exemplary embodiments, both the time headway THW and time to contact TTC are used to discriminate regions for risk potential RP and to calculate the repulsive force Fc. This is just one of various examples of discriminating regions of risk potential RP and calculation of repulsive force Fc. Another example may be using one of THW and TTC to discriminate regions for risk potential RP and to calculate the repulsive force Fc.

In each of the first to seventh exemplary embodiments, a radar 10 and an obstacle recognition device 40 function to detect obstacles. The vehicle speed sensor 20 is used to detect the running state or status of host vehicle 1 or 2. Controller 50 or 50A functions to calculate risk potential RP, set regions for the risk potential RP, classify the risk potential RP to one of the regions, set control parameter, calculate the rate of change during a transient period between the adjacent two regions, calculate driving and/or braking force correction amount, and calculate a driver driving force request. Controller 50 or 50A, driving force regulator 60, braking force regulator 70 and accelerator pedal reaction force generator 80 function, as control tools, to transmit the risk potential RP to the driver. The driving force regulator 60 and braking force regulator 70 may be eliminated to leave the accelerator pedal reaction force generator 80 only for transmission of the risk potential RP to the driver. In controller 50 or 50A, setting the regions in software implementation may be replaced with simple setting of necessary information associated with the regions in different locations of a memory ready for access.

In each of the first to seventh exemplary embodiments, the laser radar is used as the radar device 10. The use of laser radar is just one of various examples of radars that may be used as the radar device 10. Instead of the laser radar, radar of other types, such as, radar of the millimeter type, may be used.

While the best modes for carrying out the disclosure have been described in detail, those familiar with the art to which the present disclosure relates will recognize various alternative designs and embodiments for practicing the disclosure as defined by the following claims.

What is claimed is:

1. A system for assisting a driver in operating a vehicle, comprising:
    a device for calculating a risk potential associated with the vehicle, wherein the calculated risk potential falls in one of a plurality of predetermined regions; and
    a data processor configured to:
    regulate a value of a control parameter, wherein the value of the control parameter remains unaltered if the calculated risk potential remains in the same one of the regions, and the value of the control parameter is altered if the calculated risk potential changes from a first one of the regions to a second one of the regions; and
    control a reaction force applied to a driver controlled input device based on the value of the control parameter;
    whereby information related to a change of the risk potential associated with the vehicle from the first one of the predetermined regions to the second one of the regions is conveyed to the driver via a change of the reaction force.

2. The system of claim 1, wherein the data processor, responsive to the calculated risk potential changing from a first risk potential in a first predetermined region to a second risk potential in a second predetermined region, changes the control parameter from a first value corresponding to the first predetermined region to a second value corresponding to the second predetermined region,
    wherein the control parameter changes from the first value to the second value at a predetermined rate of change.

3. The system of claim 2, wherein the second value is constant.

4. The system of claim 2, wherein responsive to the second predetermined region representing a higher risk potential, the second value has a higher value, and the control parameter changes from the first value to the second value at a higher rate.

5. The system of claim 1, wherein at least one of the plurality of predetermined regions includes a first region that the value of the control parameter varies with the risk potential, and a second region that the value of the control parameter is a constant value.

6. The system of claim 1, wherein the plurality of predetermined regions includes at least two different lengths.

7. A method for assisting a driver in operating a vehicle, comprising:
    calculating a risk potential associated with the vehicle, wherein each calculated risk potential falls in one of a plurality of predetermined regions;
    regulating a value of a control parameter, wherein the value of the control parameter remains unaltered if the calculated risk potential remains in the same one of the regions, and the value of the control parameter is altered if the calculated risk potential changes from a first one of the regions to a second one of the regions; and
    controlling a reaction force applied to a driver controlled input device based on the value of the control parameter;
    whereby information related to a change of the risk potential associated with the vehicle from the first one the predetermined regions to the second one of the regions is conveyed to the driver via a change of the reaction force.

8. A vehicle comprising:
    a device for calculating a risk potential associated with the vehicle, wherein each calculated risk potential falls in one of a plurality of predetermined regions;
    a data processor configured to regulate a value of a control parameter, and control a reaction force applied to a driver controlled input device based on the value of the control parameter; wherein the value of the control parameter remains unaltered if the calculated risk potential remains in the same one of the regions, and the value of the control parameter is altered if the calculated risk potential changes from a first one of the regions to a second one of the regions; and whereby information related to a change of the risk potential associated with the vehicle from the first one the predetermined regions to the second one of the regions is conveyed to the driver via a change of the reaction force.

9. A system for assisting a driver in operating a vehicle, comprising:
   means for calculating a risk potential associated with the vehicle, wherein each calculated risk potential falls in one of a plurality of predetermined regions;
   means for regulating a value of a control parameter and for controlling a reaction force applied to a driver controlled input device based on the value of the control parameter; wherein the value of the control parameter remains unaltered if the calculated risk potential remains in the same one of the regions, and the value of the control parameter is altered if the calculated risk potential changes from a first one of the regions to a second one of the regions; and
   controlling a reaction force applied to a driver controlled input device based on the value of the control parameter;
   whereby information related to a change of the risk potential associated with the vehicle from the first one the predetermined regions to the second one of the regions is conveyed to the driver via a change of the reaction force.

10. A system for assisting a driver in operating a vehicle, comprising:
   a risk calculating section configured to calculate a value of risk potential associated with the vehicle, wherein each calculated risk potential falls in one of a plurality of predetermined regions, and each of the regions is assigned a predetermined value of a control parameter;
   a data processor configured to:
      control at least one of a reaction force applied to a driver controlled input device based on the value of the control parameter; and
      determine which one of the regions that the calculated risk potential falls, and a control value corresponding to the determined region;
   wherein:
   a value of the control parameter remains unaltered when the calculated value of risk potential remains in the same one of the regions, and
   the value of the control parameter changes when the calculated risk potential changes from a first one of the regions to a second one of the regions.

* * * * *